(12) United States Patent
Kelly et al.

(10) Patent No.: US 7,619,462 B2
(45) Date of Patent: Nov. 17, 2009

(54) UNPOWERED SWITCH AND BLEEDER CIRCUIT

(75) Inventors: Dylan J. Kelly, San Diego, CA (US); Clint L. Kemerling, Escondido, CA (US)

(73) Assignee: Peregrine Semiconductor Corporation, San Diego, CA (US)

( * ) Notice: Subject to any disclaimer, the term of this patent is extended or adjusted under 35 U.S.C. 154(b) by 521 days.

(21) Appl. No.: 11/351,342

(22) Filed: Feb. 9, 2006

(65) Prior Publication Data

US 2006/0199563 A1    Sep. 7, 2006

Related U.S. Application Data

(60) Provisional application No. 60/651,736, filed on Feb. 9, 2005.

(51) Int. Cl.
*H03K 17/687* (2006.01)

(52) U.S. Cl. ............... 327/427; 327/431; 455/323; 455/330

(58) Field of Classification Search ............... None
See application file for complete search history.

(56) References Cited

U.S. PATENT DOCUMENTS

| | | | |
|---|---|---|---|
| 3,699,359 A | 10/1972 | Shelby | |
| 4,316,101 A | 2/1982 | Minner | |
| 5,012,123 A | 4/1991 | Ayasli et al. | |
| 5,313,083 A | 5/1994 | Schindler | |
| 5,416,043 A | 5/1995 | Burgener et al. | |
| 5,492,857 A | 2/1996 | Reedy et al. | |
| 5,548,239 A | 8/1996 | Kohama | |
| 5,553,295 A | 9/1996 | Pantelakis et al. | |
| 5,572,040 A | 11/1996 | Reedy et al. | |
| 5,596,205 A | 1/1997 | Reedy et al. | |
| 5,600,169 A | 2/1997 | Burgener et al. | |
| 5,663,570 A | 9/1997 | Reedy et al. | |
| 5,777,530 A * | 7/1998 | Nakatuka | ............... 333/104 |

(Continued)

FOREIGN PATENT DOCUMENTS

JP        A-55-75348        6/1980

(Continued)

OTHER PUBLICATIONS

Orndorff, et al. "CMOS/SOS/LSI Switching Regulator Control Device", Solid-State Circuits Conference, Digest of Technical Papers, 1978 IEEE International, vol. XXI, pp. 234-235, Feb. 1978.

(Continued)

*Primary Examiner*—An T Luu
(74) *Attorney, Agent, or Firm*—Jaquez & Associates; Martin J. Jaquez, Esq.; Larry D. Flesner

(57) ABSTRACT

A novel RF switch for switching radio frequency (RF) signals is disclosed. The RF switch may comprise both enhancement and depletion mode field-effect transistors (E-FETs and D-FETs) implemented as a monolithic integrated circuit (IC) on a silicon-on-insulator (SOI) substrate. The disclosed RF switch, with a novel bleeder circuit, may be used in RF applications wherein a selected switch state and performance are required when the switch and bleeder circuits are not provided with operating power (i.e., when the switch and bleeder circuits are "unpowered").

22 Claims, 9 Drawing Sheets

U.S. PATENT DOCUMENTS

| | | | |
|---|---|---|---|
| 5,801,577 | A | 9/1998 | Tailliet |
| 5,861,336 | A | 1/1999 | Reedy et al. |
| 5,863,823 | A | 1/1999 | Burgener et al. |
| 5,883,396 | A | 3/1999 | Reedy et al. |
| 5,895,957 | A | 4/1999 | Reedy et al. |
| 5,920,233 | A | 7/1999 | Denny |
| 5,930,638 | A | 7/1999 | Reedy et al. |
| 5,945,867 | A | 8/1999 | Uda et al. |
| 5,973,363 | A | 10/1999 | Staab et al. |
| 5,973,382 | A | 10/1999 | Burgener et al. |
| 6,057,555 | A | 5/2000 | Reedy et al. |
| 6,066,993 | A | 5/2000 | Yamamoto et al. |
| 6,563,366 | B1 | 5/2003 | Kohama |
| 6,642,578 | B1 | 11/2003 | Arnold et al. |
| 6,804,502 | B2 | 10/2004 | Burgener et al. |
| 7,460,852 | B2 | 12/2008 | Burgener et al. |

FOREIGN PATENT DOCUMENTS

| | | |
|---|---|---|
| JP | A-02-161769 | 6/1990 |
| JP | A-06-334506 | 12/1994 |
| JP | A-08-307305 | 11/1996 |
| JP | A-09-284114 | 10/1997 |
| JP | A-10-242829 | 9/1998 |
| JP | A-11-136111 | 5/1999 |

OTHER PUBLICATIONS

Caverly, Robert H., et al., "A Silicon CMOS Monolitithic RF and Microwave Switching Element", 1997 European Microwave Conference, Jerusalem, Sep. 1997, 4 pgs.

Huang, "A 0.5 •m CMOS T/R Switch for 900-MHz Wireless Applications"; IEEE Journal of Solid-State Circuits, vol. 36, No. 3, Mar. 2001, pp. 486-492.

Lauterbach, et al., "Charge Sharing Concept and New Clocking Scheme for Power Efficiency and Electromagnetic Emission Improvement of Boosted Charge Pumps", IEEE Journal of Solid-State Circuits, vol. 35, No. 5, May 2000, pp. 719-723.

Makioka, et al., "Super Self-Aligned GaAs RF Switch IC with 0.25 dB Extremely Low Insertion Loss for Mobile Communication Systems", IEEE Transactions on Electron Devices, vol. 48, No. 8, Aug. 2001, pp. 1510-1514.

Rodgers, et al., "Silicon UTSi CMOS RFIC for CDMA Wireless Communications Systems", Peregrine Semiconductor Corporation, 1999 IEEE MTT-S Digest.

Megahed, et al., "Low Cost UTSI Technology for RF Wireless Applications", Peregrine Semiconductor Corporation, 1998 IEEE MTT-S Digest.

Johnson, et al., "Advanced Thin-Film Silicon-on-Sapphire Technology: Microwave Circtuit Applications", IEEE Transactions on Electron Devices, vol. 45, No. 5, May 1998, pp. 1047-1054.

Mark L. Burgener, "CMOS SOS Switches Offer Useful Features, High Integration", CMOS SOS Switches, Microwaves & RF, Aug. 2001, pp. 107-118.

Le, Dinh T., International Search Report from the USPTO, Mar. 28, 2003, U.S. Appl. No. 10/267,531, 2 pgs.

Tieu, Binh Kien, Notice of Allowance and Fee(s) Due from the USPTO, May 12, 2004, U.S. Appl. No. 10/267,531, 7 pgs.

Burgener, et al., Comments on Examiner's Statement of Reasons for Allowance filed in PTO on Aug. 12, 2004 for U.S. Appl. No. 10/267,531, 2 pgs.

Tieu, Binh Kien, Office Action from USPTO, Jun. 3, 2005, U.S. Appl. No. 10/922,135, 8 pgs.

Burgener, et al., Amendment filed in PTO on Dec. 5, 2005 for U.S. Appl. No. 10/922,135, 7 pgs.

Miyajima, Ikumi, Notice of Reasons for Refusal from the Japanese Patent Office dated Feb. 13, 2006 for Appln. No. 2003-535287, 3 pgs.

Tieu, Binh Kien, Office Action from USPTO, Jan. 17, 2006, U.S. Appl. No. 10/922,135, 8 pgs.

Burgener, et al., Response filed in PTO on May 16, 2006 for U.S. Appl. No. 10/922,135, 2 pgs.

Tieu, Binh Kien, Notice of Allowance from USPTO, Jun. 2, 2006 for U.S. Appl. No. 10/922,135, 5 pgs.

Van Der Peet, H., Communication Pursuant to Article 94(3) EPC received from the EPO in related appln. No. 02 800 982.7-2220 dated Jun. 19, 2008, 3 pgs.

Tieu, Binh Kien, Office Action from USPTO dated Nov. 15, 2007 for related U.S. Appl. No. 11/582,206, 9 pages.

Burgener, et al., Amendment filed in USPTO dated May 15, 2008 for related U.S. Appl. No. 11/582,206, 10 pages.

Tieu, Binh Kien, Notice of Allowance from USPTO dated Jul. 15, 2008 for related U.S. Appl. No. 11/582,206, 6 pages.

Mijajima Ikumi, English Translation of Notice of Reasons for Refusal in related Japanese application No. 2003-535287, 4 pages.

\* cited by examiner

UNPOWERED SWITCH AND BLEEDER CIRCUIT

This application claims the benefit under 35 U.S.C. § 119(e) of U.S. Provisional Application No. 60/651,736, filed Feb. 9, 2005, entitled "UNPOWERED SWITCH AND BLEEDER CIRCUIT", hereby incorporated by reference herein in its entirety; and this application is related to co-pending and commonly owned application Ser. No. 11/347,014, filed Feb. 3, 2006, pending, entitled "Symmetrically and Asymmetrically Stacked Transistor Grouping RF Switch", which is a Continuation-in-Part (CIP) of co-pending and commonly owned U.S. application Ser. No. 10/922,135, filed Aug. 18, 2004, entitled "Switch Circuit and Method of Switching Radio Frequency Signals", pending, which is a continuation of U.S. Pat. No. 6,804,502 issued Oct. 12, 2004, entitled "Switch Circuit and Method of Switching Radio Frequency Signals", filed Oct. 8, 2002 as application Ser. No. 10/267,531, which claims the benefit under 35 U.S.C. § 119(e) of U.S. Provisional Application No. 60/328,353, filed Oct. 10, 2001, entitled "Silicon-on-Insulator RF Switches"; and application Ser. No. 11/347,014, filed Feb. 3, 2006, pending, entitled "Symmetrically and Asymmetrically Stacked Transistor Grouping RF Switch" claims the benefit under 35 U.S.C. § 119(e) of U.S. Provisional Application No. 60/650,033, filed Feb. 3, 2005, entitled "Symmetrically and Asymmetrically Stacked Transistor Grouping RF Switch". This application is related to each of the applications and issued patent set forth above. Further, all of the applications and issued patent set forth above are hereby incorporated by reference herein as if set forth in full.

Specifically, U.S. Provisional Application No. 60/650,033, filed Feb. 3, 2005, CIP application Ser. No. 11/347,014, filed Feb. 3, 2006, Continuation application Ser. No. 10/922,135, filed Aug. 18, 2004, U.S. application Ser. No. 10/267,531, filed Oct. 8, 2002 (Issued U.S. Pat. No. 6,804,502), and the related provisional application (U.S. Provisional Application No. 60/328,353, filed Oct. 10, 2001) are all incorporated by reference herein in their entirety.

BACKGROUND

1. Field

The present teachings relate to switches, and particularly to a switch circuit for switching radio frequency (RF) signals. The RF switch, with a novel bleeder circuit, may be used in RF applications wherein a specified switch performance is required when normal operating power is turned off. In one embodiment, the RF switch comprises enhancement and depletion mode devices implemented as an integrated circuit on a silicon-on-insulator (SOI) substrate.

2. Description of Related Art

Radio frequency (RF) switches for directing RF signals are found in many different RF devices such as televisions, video recorders, cable television equipment, cellular telephones, wireless pagers, wireless infrastructure equipment, and satellite communications equipment. As is well known, the performance of RF switches is controlled by three primary operating performance parameters: insertion loss, switch isolation, and the "1 dB compression point." These three performance parameters are tightly coupled, and any one parameter can be emphasized in the design of RF switch components at the expense of others. A fourth performance parameter that is occasionally considered in the design of RF switches is commonly referred to as the switching time or switching speed (defined as the time required to turn one side of a switch on and turn the other side off). Other characteristics that are important in RF switch design include ease and degree (or level) of integration of the RF switch, complexity, yield, return loss, and cost of manufacture.

For RF devices there are many Federal Communication Commission (FCC) standards that must be complied with in design and operation. One well-known standard, designated as FCC Part 15.115, specifies minimum isolation requirements between different input nodes and output nodes for RF switches. For example, the RF switch in a television that switches the RF tuner input between an antenna and a cable TV signal must comply with this standard. Furthermore, these isolation requirements must be maintained even when the RF devices are unplugged or turned off.

Other RF switches may be required to assume an appropriate default operating state and performance when the RF switch is not provided with operating power (i.e., when the switch is "unpowered"). For example, a switch in a video recorder that switches the recorder output between an internal modulator signal and an external RF signal (e.g., cable TV or antenna) is required to default to a low-loss connection for the external RF signal when the video recorder is unplugged or turned off.

An additional requirement for many RF switches involves maintaining proper termination impedance for the RF signal. For example, the Data Over Cable Service Internet Specification (DOCSIS) requires that an appropriate termination impedance (e.g., 75 ohms) for a cable TV signal be maintained by the input of an RF switch even when the RF switch is unpowered.

A challenge associated with designing RF switches capable of unpowered operation using integrated circuits arises from the fact that a transistor generally requires non-zero bias levels for proper operation. For example, if the gate of a field-effect transistor (FET) is not provided with a controlled DC bias level, the FET may assume an on-state, an off-state, or somewhere in between, depending on the type of FET, RF signal, and other circuit elements coupled to the gate. Further, unpowered solid-state switches include non-linear elements. These can cause rectification of RF signals and undesired bias conditions. According to prior art, relays have been used for RF switches that must meet performance specifications for unpowered operation. Although relays can be designed to assume desired default operation when unpowered, relays are bulky, expensive, unreliable, require high current to operate, and have limited switching speeds. Consequently, a need exists for an RF switch that meets performance requirements when unpowered, and that can be readily fabricated as a monolithic integrated circuit.

SUMMARY

A novel RF switch for switching radio frequency (RF) signals is disclosed. The RF switch may comprise both enhancement and depletion mode field-effect transistors (E-FETs and D-FETs) implemented as a monolithic integrated circuit (IC) on a silicon-on-insulator (SOI) substrate. The disclosed RF switch, with a novel bleeder circuit, may be used in RF applications wherein a specified performance is required when the switch circuit and the bleeder circuit are not provided with operating power (i.e., when the switch is placed in an "UNPOWERED-STATE"). In one embodiment, the RF switch is fabricated on an Ultra-Thin-Silicon ("UTSi") substrate, also referred to herein as "silicon on sapphire" (SOS).

An exemplary embodiment of a depletion-enhancement (D-E) RF switch with unpowered operation includes: an input RF1 for a receiving an RF signal; a depletion-mode switch (D-Sw) coupled to the input to receive the RF signal and coupled to an output RFout, wherein the D-Sw is controlled by a control line C1; an enhancement-mode shunt (E-Sh) coupled to the input to receive the RF signal and to a ground; wherein the E-Sh is controlled by a control line C1x; a control circuit coupled to the control lines C1 and C1x, wherein the control circuit provides selected control voltages to the control lines C1 and C1x; and bleeder circuits C1-B and C1x-B, wherein the control line C1 is coupled to C1-B and C1x is coupled to C1x-B. The control voltages for an ON-STATE of the D-E RF switch are selected so that the D-Sw is ON and the E-Sh is OFF. The control voltages for an OFF-STATE are selected so that the D-Sw is OFF and the E-Sh is ON. For an UNPOWERED-STATE, C1-B and C1x-B are adapted to connect the control lines C1 and C1x, respectively, to ground by a low-impedance connection, thereby turning the D-Sw ON and the E-Sh OFF and conveying the RF signal from the input RF1 to the output RFout.

An exemplary embodiment of an enhancement-depletion (E-D) RF switch includes: an input RF1 for receiving an RF signal; an enhancement-mode switch (E-Sw) coupled to the input to receive the RF signal and coupled to an output RFout, wherein the E-Sw is controlled by a control line C2; a depletion-mode shunt (D-Sh) coupled to the input to receive the RF signal and to a ground; wherein the D-Sh is controlled by a control line C2x; a control circuit coupled to the control lines C2 and C2x, wherein the control circuit provides selected control voltages to the control lines C2 and C2x; and bleeder circuits C2-B and C2x-B, wherein the control line C2 is coupled to C2-B, and C2x is coupled to C2x-B. The control voltages for an ON-STATE are selected so that the E-Sw is ON and the D-Sh is OFF. The control voltages for an OFF-STATE are selected so that the E-Sw is OFF and the D-Sh is ON. For an UNPOWERED-STATE, the bleeder circuits C2-B and C2x-B are adapted to connect the control lines C2 and C2x, respectively, to ground by a low-impedance connection, thereby turning the E-Sw OFF and the D-Sh ON, isolating the input RF1 from the output RFout and conveying the RF signal to ground.

As described above, in one exemplary embodiment, a novel bleeder circuit may be operatively coupled to each of the control lines C1, C1x, C2, and C2x, and to ground. For a POWERED-STATE condition (i.e., operating power is supplied to the switch), in one embodiment, a bleeder circuit provides an OPEN connection (i.e., high-impedance connection) between a control line and ground, thereby allowing the selected control voltages to control the switch and shunt transistors. For the UNPOWERED-STATE condition (i.e., switch circuit is not provided with operating power), in one embodiment, a bleeder circuit provides a CLOSED connection (i.e., low-impedance) between a control line and ground, thereby setting the switch and shunt transistors to the desired UNPOWERED-STATE condition. The bleeder circuits may be incorporated as components of the control circuit, or the bleeder circuits may comprise separate components. The bleeder circuits prevent rectification of RF signals and undesired bias conditions from detrimentally affecting the performance of the RF switches when placed in the UNPOWERED-STATE.

One exemplary embodiment of a bleeder circuit may include a depletion-mode p-channel (DP) transistor DP1, a DP transistor DP2, a depletion-mode n-channel (DN) transistor DN1, a positive bias circuit, and a negative bias circuit. In one embodiment, a first node of the DP1 transistor channel is coupled to a control line, and a second node of the DP1 transistor channel is coupled to a first node of the DN1 transistor channel. A second node of the DN1 transistor channel is coupled to ground. A first node of the DP2 transistor channel is coupled to the gate of DP1. A second node of the DP2 transistor channel is coupled to the gate of DN1. The gate of DP2 is coupled to receive VDD (i.e., the positive voltage of a power supply), thereby turning DP2 OFF for the POWERED-STATE. For the POWERED-STATE, the positive bias circuit provides a positive voltage to the gate of DP1, thereby turning the DP1 transistor OFF. Likewise, for the POWERED-STATE, negative bias circuit provides a negative voltage to the gate of DN1, thereby turning the DN1 transistor OFF. Consequently, the bleeder circuit provides a high-impedance connection between a control line and ground for the POWERED-STATE, thereby allowing the control voltages to control the switch and shunt transistors of the RF switch.

When an UNPOWERED-STATE condition occurs, the sources for VDD and VSS (the positive and negative supply voltages) may become high impedance sources or may go to ground potential. If the sources become high impedance, the positive and negative bias circuits are adapted to pull the voltages at the gates of the DP1 and DN1 transistors, respectively, to zero voltage. Further, when VDD drops below a threshold voltage for the transistor DP2 it turns on, also pulling the voltages at the gates of the transistors DP1 and DN1 to zero. Because DP1 and DN1 are depletion mode transistors, DP1 and DN1 are turned ON when an UNPOWERED-STATE occurs, and a control line may thereby be provided with a low-impedance connection to ground. As noted above, low-impedance connections between the control lines and ground enable the switch and shunt transistors of the RF switch to be set to the desired states for the UNPOWERED-STATE condition.

For some embodiments of the bleeder circuit described above, one or more of the transistors DP1, DP2 and DN1 may each be replaced by a plurality of similar transistors in series. The use of transistors in series is a method for increasing the voltages that can be employed.

Persons skilled in the arts of designing RF circuits will understand that a plurality of D-E RF switches as described above may be incorporated in a combined circuit known as "cascaded series-shunt pairs." For example, the output of a first D-E RF switch may be coupled to the input of a second D-E RF switch, the output of the second D-E RF switch may be coupled to the input of a third D-E RF switch, etc., until a last D-E RF switch is coupled to an RF common node or other final output for the combined circuit. Likewise, a plurality of E-D switches may be incorporated into a combined circuit of this type. Such combined circuits are referred to herein as "cascaded" circuits. The use of cascaded circuits allows for improvements in switch performance, such as improvements in switch isolation and linearity.

An embodiment of a single-pole double-throw (SPDT) RF switch may include: a first input for receiving a first RF signal; a D-E RF switch coupled to the first input to receive the RF signal and coupled to an RF common port; a second input for receiving a second RF signal; an E-D RF switch coupled to the second input to receive the second RF signal and coupled to the RF common port. In an example of this embodiment, for the UNPOWERED-STATE, the first RF signal is coupled to the RF common and the second RF signal is disconnected. In another embodiment of the SPDT RF switch described above, the D-E RF switch may include a cascaded circuit of D-E RF switches. Likewise, the E-D RF switch circuit may include a cascaded circuit of E-D RF switches.

Another embodiment of an SPDT RF switch may include: a first input for receiving a first RF signal; a first E-D RF switch coupled to the first input to receive the RF signal and coupled to an RF common port; a second input for receiving a second RF signal; a second E-D RF switch coupled to the second input to receive the second RF signal and coupled to the RF common port. In an example of this embodiment, for the UNPOWERED-STATE both the first RF signal and the second RF signal are disconnected from the RF common node. Again, in alternative embodiments, the first and second ED-RF switches may each include a cascaded circuit of E-D RF switches.

In the examples of RF switches presented herein, an E-Sw, a D-Sw, an E-Sh, and a D-Sh may each comprise a single transistor. Alternatively and more generally, an E-Sw, a D-Sw, an E-Sh, and a D-Sh may each comprise one or more transistors coupled together in a. "stacked" or serial configuration. Above incorporated U.S. Pat. No. 6,804,502, titled "SWITCH CIRCUIT AND METHOD OF SWITCHING RADIO FREQENCY SIGNALS", issued Oct. 12, 2004, describes RF switches using stacked transistors. Also, above-incorporated co-pending and commonly owned application Ser. No. 11/347,014, filed Feb. 3, 2006, pending, entitled "Symmetrically and Asymmetrically Stacked Transistor Grouping RF Switch", and its associated above-incorporated provisional application, U.S. Provisional Application No. 60/650,033, filed Feb. 3 2005, entitled "Symmetrically and Asymmetrically Stacked Transistor Grouping RF Switch" disclose RF switch circuits having symmetrically and asymmetrically stacked switching and shunting transistor groupings.

As persons skilled in the arts of RF circuit design will understand and appreciate, in all the exemplary embodiments described hereinabove, the D-Sh and the E-Sh circuits that are coupled to RF input nodes or RF output nodes may include resistors selected to provide RF impedance matching appropriate for a desired design.

Although single-pole, single-throw and SPDT switches have been described for exemplary purposes, persons skilled in the arts of RF circuit design will understand that multi-pole, multi-throw switches (i.e., switches having an arbitrary number of poles and/or throws) may be designed, fabricated and used according to the present teachings.

BRIEF DESCRIPTION OF THE DRAWINGS

Like reference numbers and designations in the various drawings indicate like elements.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, although the exemplary embodiments described below are described as circuits fabricated using SOI technologies, those skilled in the arts of RF circuit design and manufacture shall readily appreciate that the exemplary circuits may be fabricated using other technologies, such as GaAs. The disclosed apparatus are not limited to the exemplary fabrication technologies, but rather embrace a wide range of circuit technologies.

The present disclosure describes a novel RF switch including both enhancement and depletion mode field-effect transistors (E-FETs and D-FETs) implemented as a monolithic integrated circuit (IC). The disclosed RF switch may be used in RF applications wherein a selected switch state and performance are required when the switch circuit and the bleeder circuit are not provided with operating power, referred to herein as operating in an "UNPOWERED-STATE." Examples of selected switch states for UNPOWERED-STATE operation are described in detail hereinbelow. Examples of selected performance for UNPOWERED-STATE operation may include, without limitation, having a specified insertion loss, isolation, and linearity.

Figure 1:
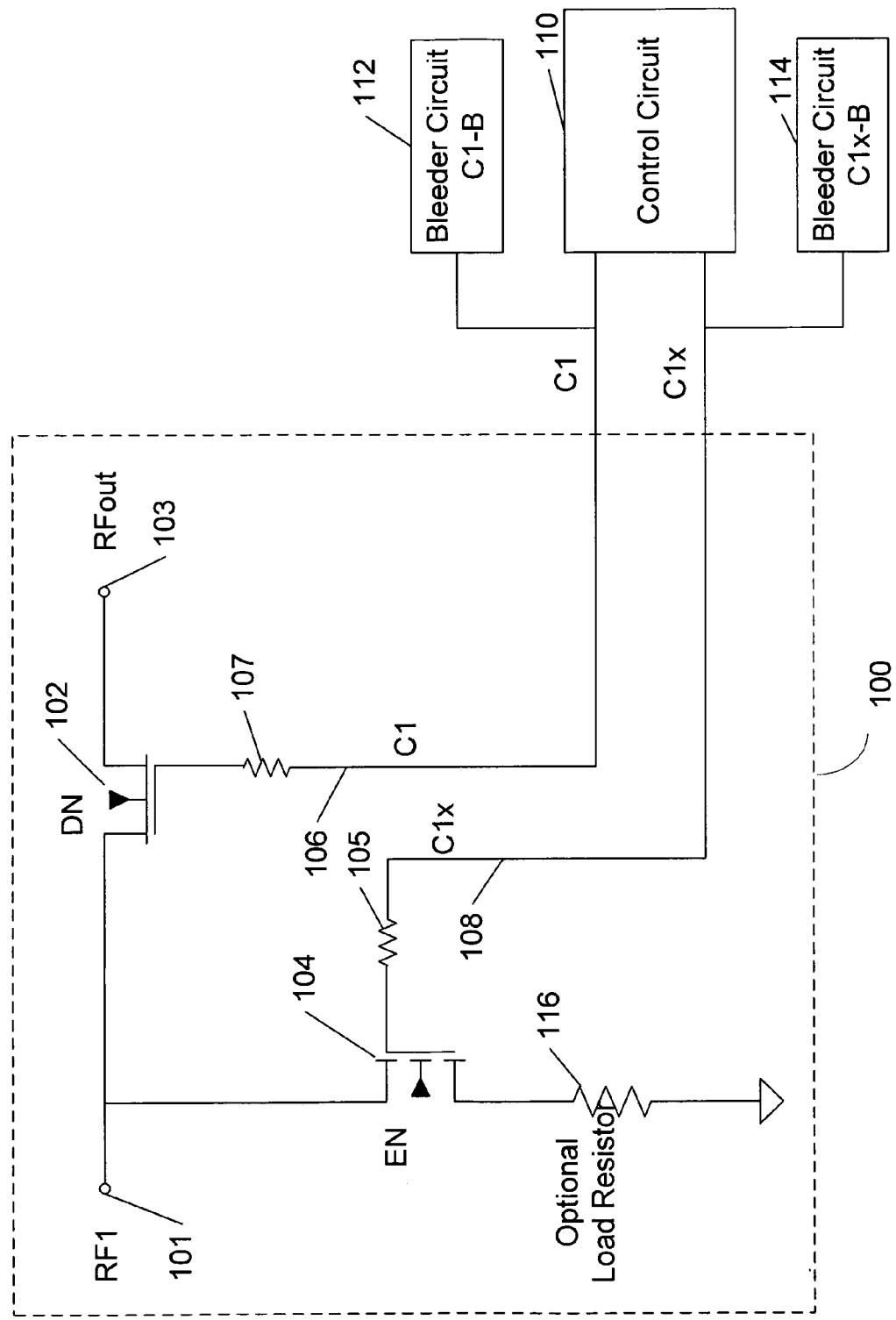
FIG. 1 schematically illustrates an embodiment of an RF Switch according to the present disclosure, wherein the switch includes a depletion-mode switch transistor (D-Sw) and an enhancement-mode shunt transistor (E-Sh).

RF Switch with a Depletion-Mode Switch Transistor and an Enhancement-Mode Shunt Transistor An embodiment of an RF Switch 100 using a depletion-mode switch (D-Sw) transistor 102 and an enhancement-mode shunt (E-Sh) transistor 104 is shown schematically in FIG. 1. This first exemplary embodiment is referred to herein as a "D-E RF switch" or a "D-E switch".

As shown in FIG. 1, in one embodiment an RF input node 101 receives an input RF signal RF1. For an ON-STATE, the D-E RF switch 100 conveys the input RF signal through the D-Sw transistor 102 to an RF output RF out 103. For an OFF-STATE, the D-E RF switch 100 conveys the input signal through the E-Sh transistor 104 either directly to ground, or through an optional load resistor 116 to ground. The optional load resistor 116 (which may be implemented as a transistor in some embodiments) may be selected to provide RF impedance matching for the input RF signal RF1. For the UNPOWERED-STATE, the D-E RF switch 100 also conveys the input RF signal to the RF output 103, as described below.

In one embodiment, a first channel node of the D-Sw 102 (e.g., a depletion-mode n-channel (DN) transistor) receives the input RF signal from the RF input 101, and a second channel node is coupled to the RF output 103. In one embodiment, a DN transistor may have a threshold voltage of approximately −0.5 V. A control line 106 is coupled to a first node of a gate resistor 107. A second node of the gate resistor 107 is coupled to the gate of the D-Sw 102. The gate resistor 107 (and like resistors shown in the FIGURES) prevents the RF signal from turning on the D-Sw transistor 102 and thereby improves the RF performance. The resistance of resistor 107 is selected so that it is high compared to the RF impedance of the parasitic drain-to-gate and gate-to-source capacitances of the D-Sw transistor 102. In one embodiment, a typical value for the resistor 107 may be in the range of 100 K ohm. Those skilled in the RF switch design arts shall appreciate that other values for the resistor 107 may be used without departing from the scope or spirit of the present disclosure.

As shown in FIG. 1, the control line 106 is also coupled to a control circuit 110. The control circuit 110 provides selected control voltages to control the channel conductance of the D-Sw transistor 102. Design and fabrication of control circuits for providing digital control voltages, such as the control circuit 110, are well-known to persons skilled in the electronic arts, and therefore are not described further herein.

In one exemplary embodiment as shown in FIG. 1, a first channel node of the E-Sh transistor 104 (e.g., an enhancement-mode n-channel (EN) transistor) receives the input RF signal RF1 from the RF input node 101, and a second channel node is coupled either directly to ground, or to the optional load resistor 116, which is coupled to ground. In one embodiment, an EN transistor may have a threshold voltage of approximately +0.8 V. A control line 108 is coupled to a first node of a gate resistor 105. A second node of the gate resistor 105 is coupled to the gate of the E-Sh transistor 104 and to the control circuit 110.

The control circuit 110 provides selected control voltages (i.e., C1x control signal) to control the channel conductance of the E-Sh transistor 104.

In one embodiment, the control voltages for an ON-STATE of the D-E RF switch selected so that the D-Sw transistor 102 is ON (i.e., conductive) and the E-Sh transistor 104 is OFF (i.e., non-conductive). In one embodiment, the control voltages for an OFF-STATE of the D-E RF switch 100 are selected so that the D-Sw transistor 102 is OFF and the E-Sh transistor 104 is ON. For an UNPOWERED-STATE of the D-E RF switch 100, the control lines 106 and 108 are coupled in one embodiment to an approximately zero voltage, thereby turning the D-Sw transistor 102 ON and the E-Sh transistor 104 OFF.

For an UNPOWERED-STATE, the outputs of the control circuit 110 are at approximately zero voltage. However, such a control circuit may constitute a relatively high-impedance connection to ground when the switch operates in the UNPOWERED-STATE. In addition, such a control circuit may also include non-linear circuit elements that can disadvantageously rectify an RF signal that may be present at the RF input 101 and feed-through to the gates of the D-Sw transistor 102 and/or the E-Sh transistor 104. Consequently, as shown in FIG. 1, in some embodiments, bleeder circuits 112 and 114 may be coupled to the control lines 106 and 108. Exemplary bleeder circuits are described in more detail below.

In some exemplary embodiments, the shunt circuit elements 104, 105, 116, 108, and 114 may optionally be removed (i.e., they may be absent from the RF switch 100 shown in FIG. 1). In such embodiments, the "D-E RF switch" described above may be referred to as a "depletion switch" or "D-sw" RF switch. In light of the disclosed apparatus described above with reference to FIG. 1, those skilled in the arts of electronic circuit design and manufacture shall readily appreciate how such a depletion switch "D-sw" RF switch may be implemented. The present disclosed RF switch apparatus encompasses both the D-E RF switch shown in FIG. 1, and the D-sw RF switch described above.

Figure 2:
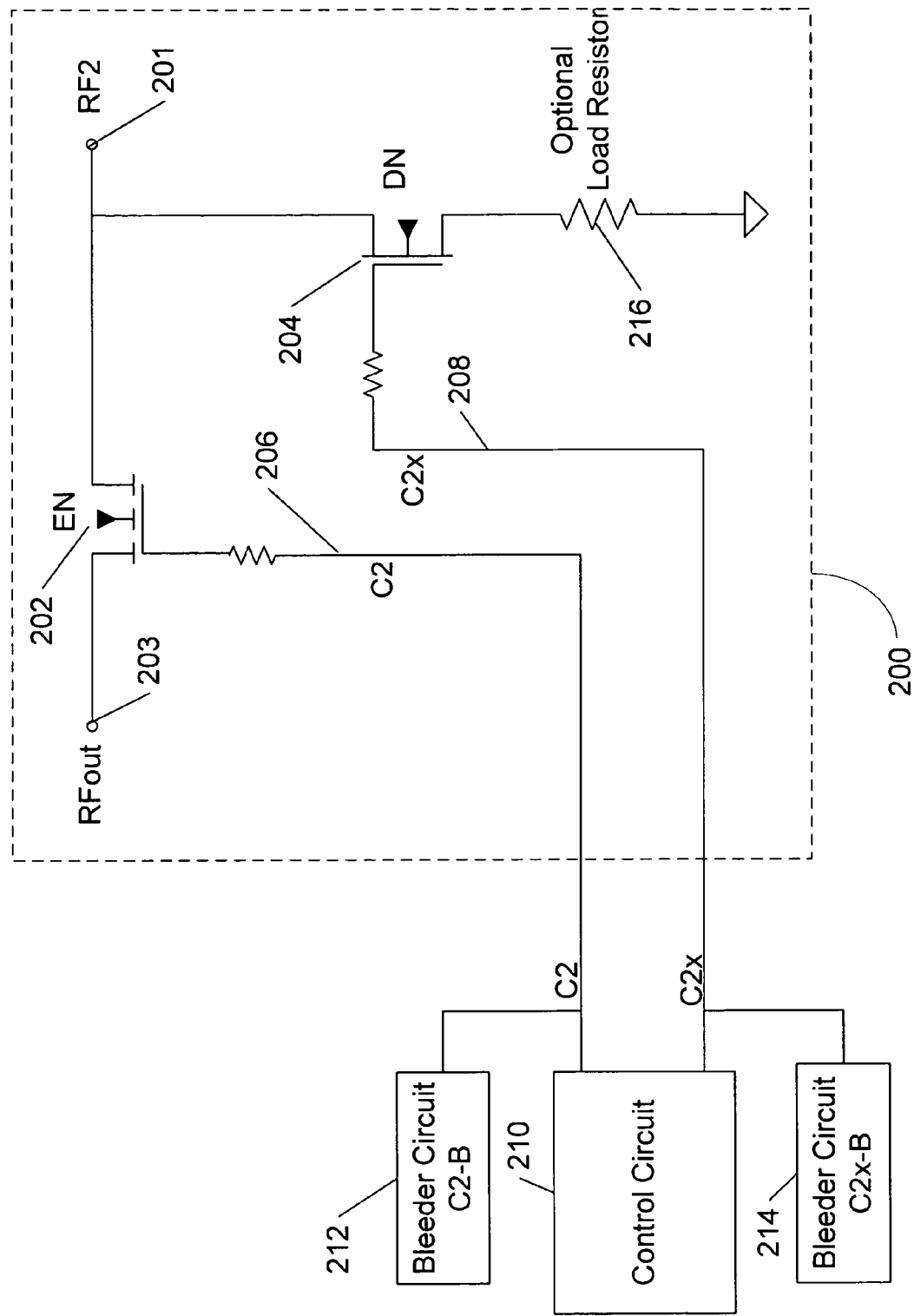
FIG. 2 schematically shows another embodiment of an RF Switch according to the present disclosure including an enhancement-mode switch transistor (E-Sw) and a depletion-mode shunt transistor (D-Sh).

RF Switch with an Enhancement-Mode Switch Transistor and a Depletion-Mode Shunt Transistor An embodiment of an RF Switch 200 using an enhancement-mode switch (E-Sw) transistor 202 and a depletion-mode shunt (D-Sh) transistor 204 is shown schematically in FIG. 2. This exemplary embodiment is referred to herein as an "E-D RF switch".

As shown in FIG. 2, in one embodiment, an RF input node 201 receives an RF input signal (i.e., RF2). For an ON-STATE, the E-D RF switch 200 conveys the RF input signal RF2 through the E-Sw transistor 202 to an RF output node 203. For an OFF-STATE, the E-D RF switch 200 conveys the RF input signal through the D-Sh transistor 204 either directly to ground, or through an optional load resistor 216 to ground. The optional load resistor 216 may be selected to provide RF impedance matching for the RF input signal. For the UNPOWERED-STATE, the E-D RF switch 200 does not convey the RF input signal to the RF output node 203, as described below.

In one embodiment, as shown in FIG. 2, a first channel node of the E-Sw transistor 202 (e.g., an EN transistor) receives the RF input signal from the RF input node 201, and a second channel node is coupled to the RF output node 203. In one embodiment, a control line C2 206 is coupled to the gate of the E-Sw transistor 202 and to a control circuit 210. The control circuit 210 provides selected control voltages that control operation of the E-Sw transistor 202 channel conductance. A first channel node of the D-Sh transistor 204 (e.g., a DN transistor) receives the RF input signal from the RF input node 201, and a second channel node is coupled either directly to ground, or to the optional load resistor 216, which is coupled to ground. A control line C2x 208 is coupled to the gate of the D-Sh transistor 204 and to the control circuit 210. In one embodiment, the control circuit 210 provides selected control signals that control the operation of the D-Sh transistor 204 channel conductance.

In one embodiment, the control voltages for an ON-STATE of the E-D RF switch 200 are selected so that the E-Sw transistor 202 is ON and the D-Sh transistor 204 is OFF. In this embodiment, the control voltages for an OFF-STATE of the E-D RF switch 200 are selected so that the E-Sw transistor 202 is OFF and the D-Sh transistor 204 is ON. For an UNPOWERED-STATE of the E-D RF switch 200, the control lines C2 206 and C2x 208 are coupled, in one embodiment, to an approximately zero voltage, thereby turning the E-Sw transistor 202 OFF and the D-Sh transistor 204 ON.

In one embodiment, for an UNPOWERED-STATE, the outputs of the control circuit 210 are at approximately zero voltage. However, such a control circuit may constitute a relatively high-impedance connection to ground in the UNPOWERED-STATE. In addition, such a control circuit may also include non-linear circuit elements that can disadvantageously rectify an RF signal that may be present at the RF input node 201 and feed-through to the gates of the E-Sw transistor 202 and/or the D-Sh transistor 204. Consequently, bleeder circuits 212 and 214 may be coupled to the control lines C2 206 and C2x 208.

In some exemplary embodiments, the switch circuit elements 202, 206 and 212 may optionally be removed and replaced by a direct short-circuit connection between the elements 201 and 203 (i.e., the switch circuit elements may be short-circuited). In such exemplary embodiments, the "E-D RF switch" described above may be referred to as a "depletion shunt" or "D-sh" RF switch. In light of the disclosed apparatus described above with reference to FIG. 2, those skilled in the arts of electronic circuit design and manufacture shall readily appreciate how such a depletion shunt or "D-sh"

RF switch may be implemented. The present disclosed RF switch apparatus encompasses both the E-D RF switch shown in FIG. 2, and the depletion shunt (D-sh) RF switch described above.

First Embodiment of a Bleeder Circuit

Figure 3A:
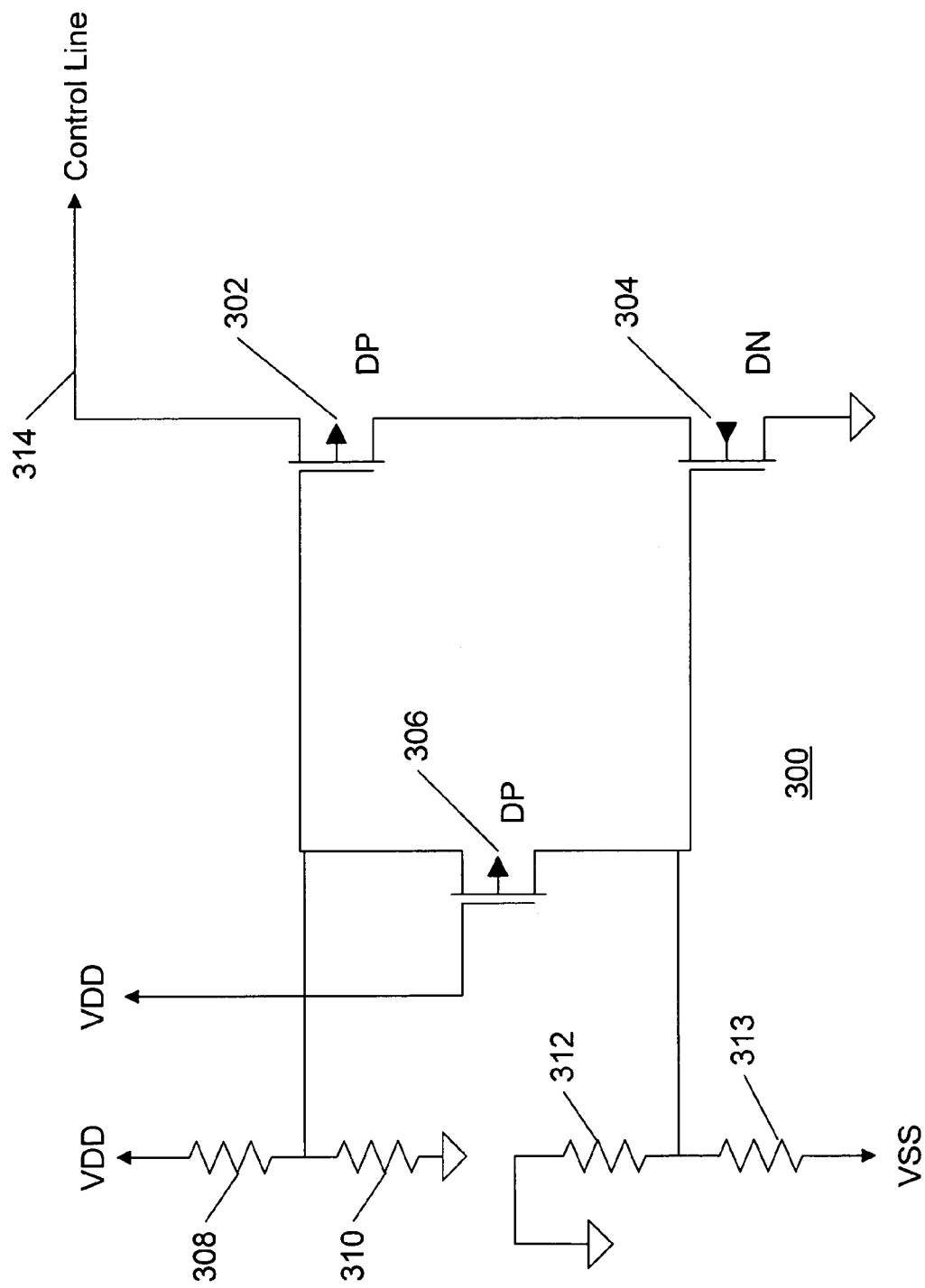
FIG. 3A schematically shows a first embodiment of a bleeder circuit in accordance with the present teachings.

FIG. 3A schematically illustrates a first embodiment of a bleeder circuit 300. As shown in the embodiment illustrated in FIG. 3A, a line 314 is coupled to a control line such as the control lines 106, 108, 206 and 208 of the circuits shown in FIGS. 1 and 2. The line 314 is coupled to a first channel node of a depletion-mode p-channel (DP) transistor 302. In the illustrated embodiment, a second channel node of the DP transistor 302 is coupled to a first channel node of a DN transistor 304. The second channel node of the DN transistor 304 is coupled to ground. In the illustrated embodiment, a first channel node of a DP transistor 306 is coupled to the gate of the DP transistor 302. A second channel node of the DP transistor 306 is coupled to the gate of the DN transistor 304. The gate of the DP transistor 306 is coupled to receive the positive voltage VDD provided by a power supply (not shown).

A first node of a resistor 308 is coupled to VDD, and a second node of the resistor 308 is coupled to a first node of a resistor 310. The second node of the resistor 310 is coupled to ground. A first node of a resistor 313 is coupled to the negative voltage VSS of a power supply (not shown), and a second node of the resistor 313 is coupled to a first node of a resistor 312. A second node of the resistor 312 is coupled to ground. The second node of the resistor 308 and the first node of the resistor 310 are jointly coupled to the gate of the DP transistor 302 and to the first channel node of the DP transistor 306. The second node of the resistor 313 and the first node of the resistor 312 are jointly coupled to the gate of the DN transistor 304 and to the second channel node of the DP transistor 306.

In one exemplary embodiment, bleeder circuit 300 operates as follows. For purposes of simplifying the description of the present disclosure, exemplary values are used for certain specified voltage levels and resistors. However, those skilled in the electronic circuits design arts shall readily understand that these values are exemplary only, and that these exemplary values may be modified for use in other applications and examples of the inventive teachings. For this example, the following values are selected: VDD=+3 V (POWERED-STATE) or 0 V (UNPOWERED-STATE); VSS=−3 V (POWERED-STATE) or 0 V (UNPOWERED STATE); the resistors 308 and 313 each comprise 20 M-ohm resistors; the resistors 310 and 312 each comprise 10 M-ohm resistors; the gate-to-source voltage (Vgs) to turn OFF the DP transistors 302 and 306 is +1.0 V; the Vgs to turn OFF the DN transistor 304 is −1.0V; the control voltages received by the line 314 are either +3 V or −3 V for the POWERED-STATE, and approximately 0 V for the UNPOWERED-STATE.

For the POWERED-STATE (i.e., VDD=+3 V, VSS=−3 V, control voltages Either +3 V or −3V) a voltage of +3. V is applied to the gate of the DP transistor 306, a voltage of +1.0 V is applied to the first channel node of the DP transistor 306, and a voltage of −1.0 V is applied to the second channel node of the DP transistor 306. For these bias levels the DP transistor 306 is OFF. For the POWERED STATE, a voltage of +1.0 V is applied to the gate of the DP transistor 302. For the POWERED-STATE, a voltage of −1.0V is applied to the gate of the DN transistor 304. For the POWERED-STATE, if the line 314 receives a control voltage of +3 V, the DP transistor 302 is ON, and the DN transistor 304 is OFF. Thus, the bleeder circuit 300 provides a high-impedance connection between the line 314 and ground. For the POWERED-STATE, if the line 314 receives a control voltage of −3 V, the DP transistor 302 is OFF, and the DN transistor 304 is OFF. Thus, again, the bleeder circuit 300 provides a high-impedance connection between the line 314 and ground.

For the UNPOWERED-STATE, the power supply sources for VDD and VSS may become high impedance sources, or they may go to a ground potential. Under these conditions, the voltages applied to the gates of the DP transistor 302 and the DN transistor 304 are pulled to zero by the resistors 310 and 313, respectively. When VDD drops below a threshold voltage for the DP transistor 306, it also turns on. Thus, for the UNPOWERED-STATE both the DP transistor 302 and the DN transistor 304 are ON, and the bleeder circuit 300 provides a low-impedance connection between the line 314 and ground.

Second Embodiment of a Bleeder Circuit

Figure 3B:
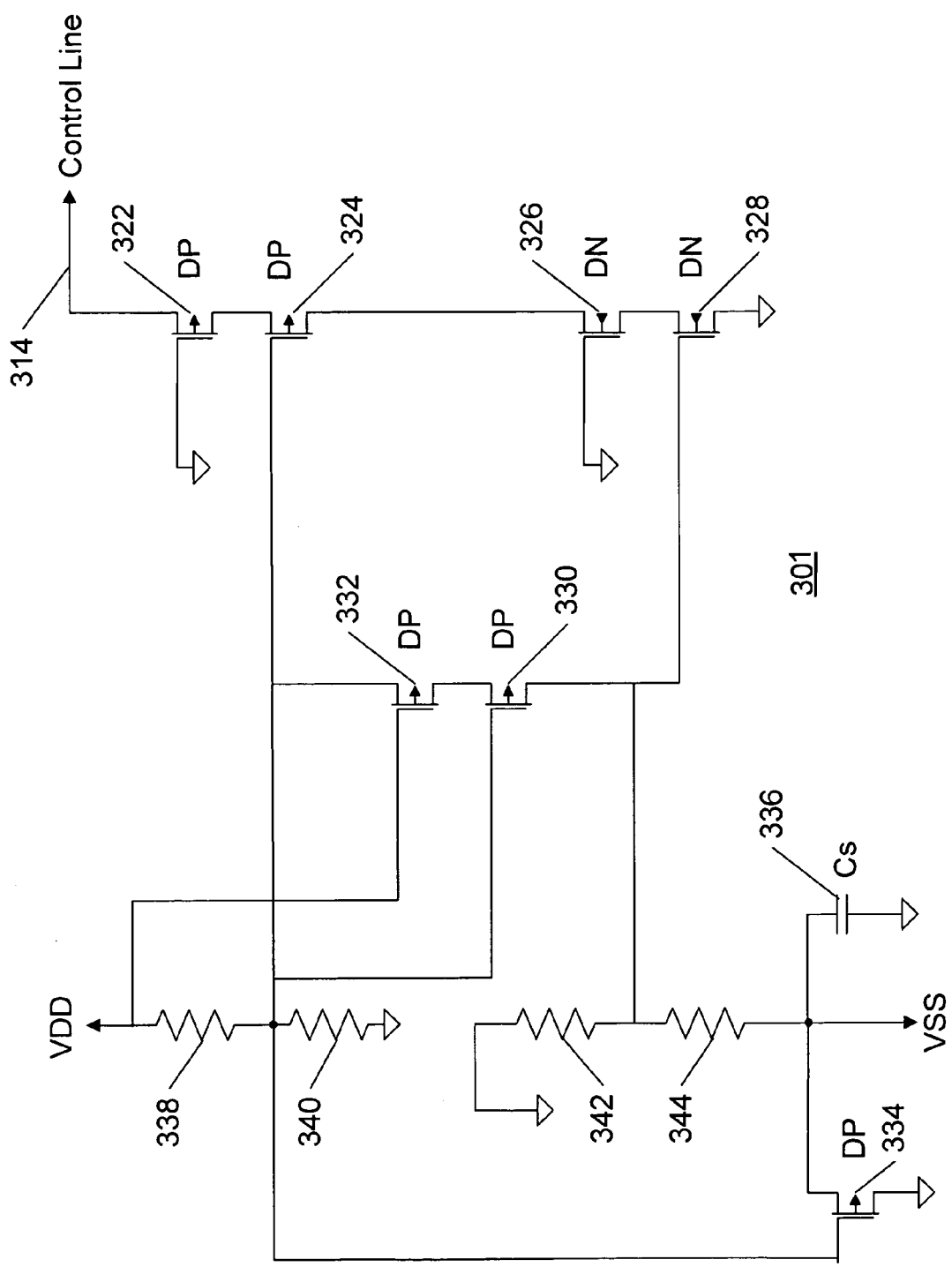
FIG. 3B schematically shows a second embodiment of a bleeder circuit in accordance with the present teachings.

Depending on the control voltages employed, and the properties of the DP transistors and DN transistors, additional circuit components may be required for proper operation of a bleeder circuit. For example, because of transistor gate oxide limitations, the DP transistors 302 and 306 and the DN transistor 304 may not be able to sustain gate-to-channel node voltages exceeding a magnitude of 4.5 V, as would be required if the control voltages, VDD and VSS, assume values of plus and minus 3 V. FIG. 3B illustrates a second embodiment of a bleeder circuit 301 that overcomes this potential problem.

Referring now to the FIG. 3B, in one embodiment, the control line 314 is coupled to a control line such as the control lines 106, 108, 206 and 208 shown in FIGS. 1 and 2. The control line 314 is coupled to a first channel node of a DP transistor 322. In the illustrated embodiment, a second channel node of the DP transistor 322 is coupled to a first channel node of a DP transistor 324. A second channel node of the DP transistor 324 is coupled to a first channel node of a DN transistor 326. As shown in FIG. 3B, a second channel node of the DN transistor 326 is coupled to a first channel node of a DN transistor 328. A second channel node of the DN transistor 328 is coupled to ground. As shown in FIG. 3B, in one embodiment, the gate of the DP transistor 322 is coupled to ground. The gate of the DN transistor 326 is also coupled to ground. A first channel node of a DP transistor 332 is coupled to the gate of the DP transistor 324. A second channel node of the DP transistor 332 is coupled to a first channel node of the DP transistor 330. In the embodiment shown in FIG. 3B, a second channel node of the DP transistor 330 is coupled to the gate of the DN transistor 328. The gate of the DP transistor 332 is coupled to the positive voltage VDD of a power supply (not shown).

In the embodiment shown in FIG. 3B, a first node of a resistor 338 is coupled to VDD, and a second node of the resistor 338 is coupled to a first node of a resistor 340. A second node of the resistor 340 is coupled to ground. In the illustrated embodiment, a first node of a resistor 344 is coupled to the negative voltage VSS of a power supply (not shown), and a second node of the resistor 344 is coupled to a first node of a resistor 342. As shown in FIG. 3B, a second node of the resistor 342 is coupled to ground. The second node of the resistor 338 and the first node of the resistor 340 are jointly coupled to the gate of the DP transistor 324 and to the first channel node of the DP transistor 332. The second node of the resistor 344 and the first node of the resistor 342 are jointly coupled to the gate of the DN 5 transistor 328 and to the second channel node of the DP transistor 330. The second node of the resistor 338 and the first node of the resistor 340 are jointly coupled to the gate of a DP transistor 334.

In the embodiment shown in FIG. 3B, a first channel node of the DP transistor 334 is coupled to VSS and to a first node of a capacitor 336. The capacitor 336 represents storage capacitance of the power supply (not shown) that provides the supply voltage VSS. A second node of the capacitor 336 is coupled to ground. A second channel node of the DP transistor 334 is coupled to ground.

For purposes of simplifying the description of the present disclosure, exemplary values are used for certain specified voltage levels and resistors. However, those skilled in the electronic circuits design arts shall readily understand that these values are exemplary only, and that these exemplary values may be modified for use in other applications and examples of the inventive teachings. For this example, the following values are selected: VDD=+3 V (POWERED-STATE) or 0 V (UNPOWERED-STATE); VSS=−3 V (POWERED-STATE) or 0 V (UNPOWERED STATE); the resistors 338, 340, 342 and 344 each comprise 10 M-ohm resistors; the Vgs to turn off the DP transistors 322, 324, 332, 330 and 334 is +1.0 V; the Vgs to turn off the DN transistors 326 and 328 is −1.0 V; the control voltages received by the control line 314 are either +3 V or −3 V for the POWERED-STATE, and approximately 0 V for the UNPOWERED-STATE.

For the POWERED-STATE (i.e., VDD=+3V, VSS=−3V, control voltages either +3 V or −3V) a voltage of +3 V is applied to the gate of the DP transistor 332, a voltage of +1.5 V is applied to the first channel node of the DP transistor 332, and a voltage of +1.5 V is applied to the second channel node of the DP transistor 330. For these bias levels, the DP transistors 332 and 330 are turned OFF. For the POWERED-STATE, a voltage of +1.5 V is applied to the gate of the DP transistor 324. For the POWERED-STATE, a voltage of −1.5 V is applied to the gate of the DN transistor 328. For the POWERED-STATE, if the line 314 receives a control voltage of +3V, the DP transistors 322 and 324 are turned ON, and the DN transistors 326 and 328 are in a high-impedance state. Thus, the bleeder circuit 301 provides a high-impedance connection between the line 314 and ground. The two DN transistors 326 and 328 arranged in series, divide the control voltage, thus overcoming a possible problem of the bleeder circuit 300 relating to excess voltage applied to the transistors, as described above.

For the POWERED-STATE, if the line 314 receives a control voltage of −3V, the DP transistors 322 and 324 are turned OFF, the DN transistor 326 is on, and the DN transistor 328 is turned OFF. Thus, again, the bleeder circuit 301 provides a high-impedance connection between the line 314 and ground. The two DP transistors 322 and 324 arranged in series are able to sustain a voltage drop across their channels that a single DP transistor may be unable to sustain, thus overcoming a possible problem of the bleeder circuit 300 described above in more detail.

For the UNPOWERED-STATE, VDD and VSS both assume a potential of 0 V. As a result, the voltages at the gates of the DP transistors 332 and 330 are 0 V. Thus, the DP transistors 332 and 330 are turned ON. The first node of the DP transistor 332 and the second node of the DP transistor 330 are at a voltage of 0 V, and the voltage of 0 V is also present at the gates of the DP transistor 324 and the DN transistor 328. Thus, for the UNPOWERED-STATE the DP transistor 322, the DP transistor 324, the DN transistor 326 and the DN transistor 328 are turned ON, and the bleeder circuit 301 provides a low-impedance connection between the line 314 and ground.

The DP transistor 334 facilitates rapid discharge of the capacitor 336 when an UNPOWERED-STATE occurs. For the UNPOWERED-STATE, the gate of the DP transistor 334 is at a voltage of 0 V. Thus, the DP transistor 334 is turned ON when an UNPOWERED-STATE occurs, and provides a low-impedance path to discharge the capacitor 336. This reduces the time required for VSS to drop to a zero value.

First Embodiment of a Single-Pole Double-Throw RF Switch

Figure 4:
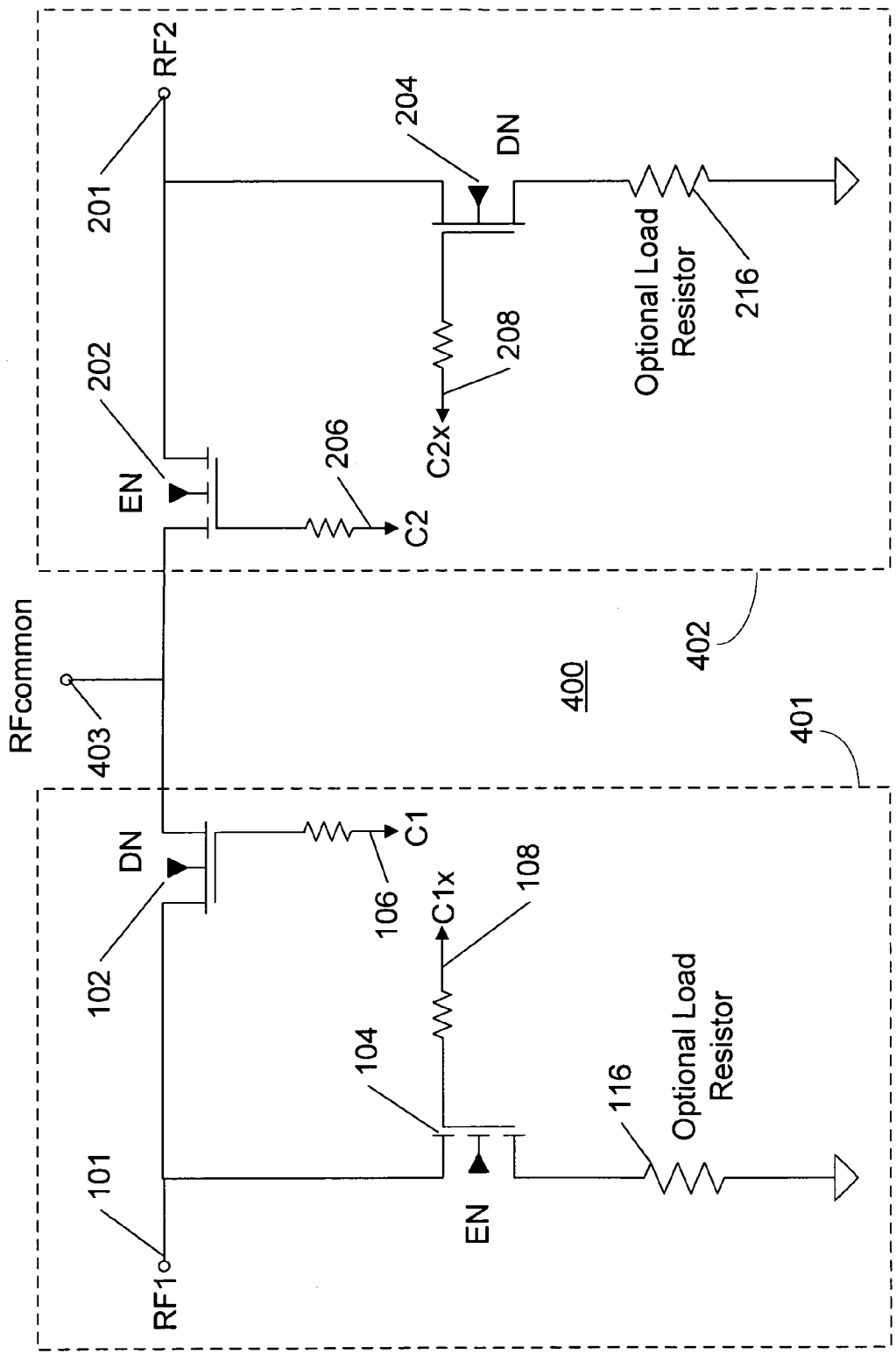
FIG. 4 schematically shows an embodiment of a single-pole, double-throw (SPDT) RF switch including a "depletion-enhancement" (D-E) RF switch and an "enhancement-depletion" (E-D) RF switch.

FIG. 4 schematically illustrates a first embodiment of a single-pole, double-throw (SPDT) RF switch 400 in accordance with the present teachings. In the embodiment shown, the SPDT RF switch 400 includes a D-E RF switch 401 and an E-D RF switch 402. The D-E RF switch 401 is similar to the D-E RF switch 100 described above with reference to the FIG. 1, except that the RF output signal is conveyed to the RF common node 403. Likewise, the E-D RF switch 402 is similar in design to the E-D RF switch 200 described above with reference to FIG. 2, except that the RF output signal is also conveyed to the RF common node 403.

Figure 5:
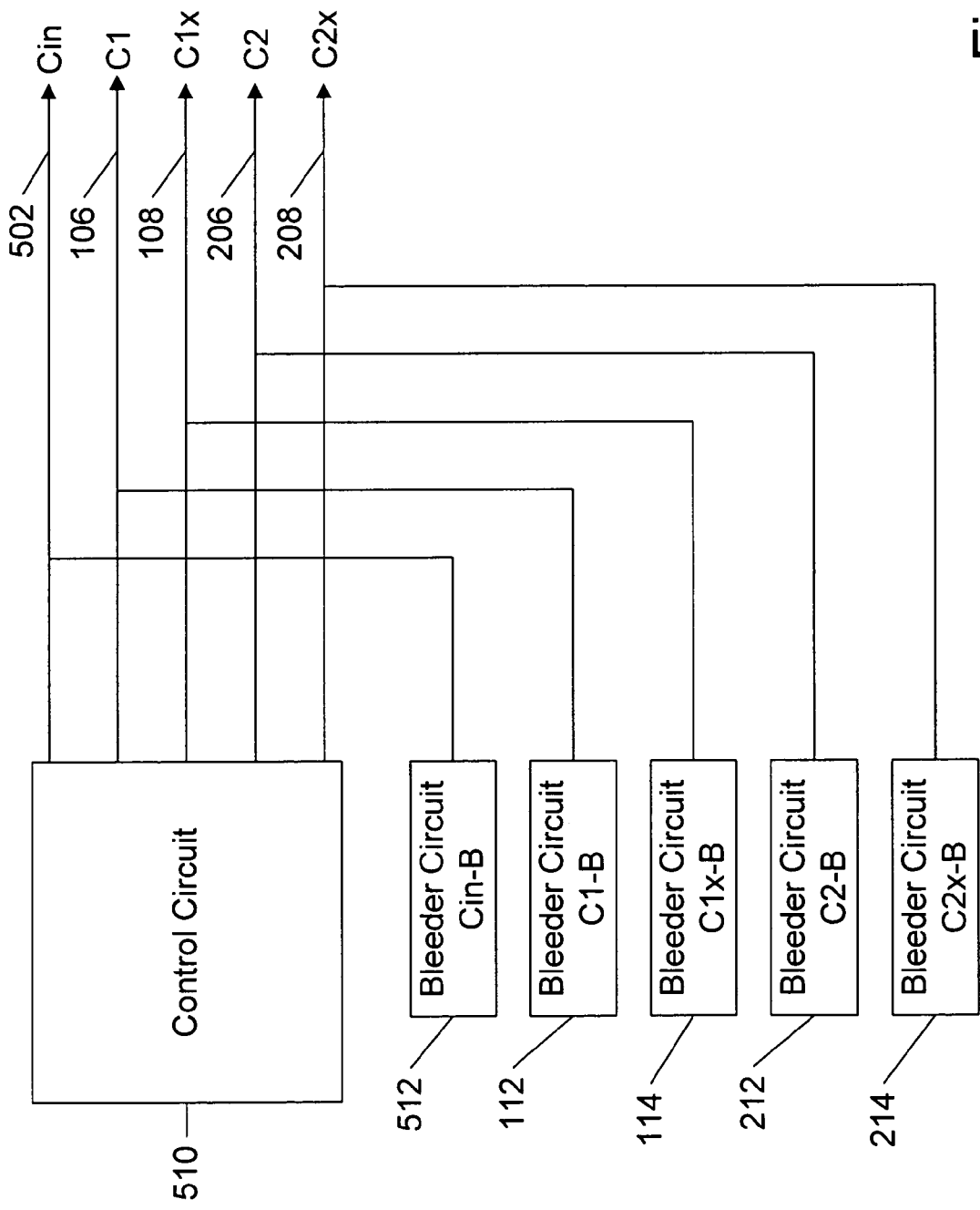
FIG. 5 is a simplified block diagram illustrating a control circuit and a plurality of bleeder circuits coupled to control lines.

Referring now to FIG. 5, a control circuit 510 and bleeder circuits 512, 112, 114, 212 and 214 are shown. The control circuit 510 is coupled to provide control voltages to the control lines 502, 106, 108, 206 and 208. The bleeder circuits 512, 112, 114, 212 and 214 are operatively coupled to the control lines 502, 106, 108, 206 and 208, respectively. The bleeder circuits may be analogous to either the bleeder circuit 300, or the bleeder circuit 301, as described above with reference to FIGS. 3A and 3B.

The control voltages provided by the control circuit 510 may be conveyed via the control lines 106, 108, 206 and 208 to like control lines 106, 108, 206 and 208, respectively, shown in FIG. 4. The purpose and operation of the control line 502 are described in more detail hereinbelow.

For the POWERED-STATE, the SPDT RF switch 400 switches the output RF signal at the RF common 403 between either the input RF1 signal received at the input node 101, or the input RF2 signal received at the input node 201, responsive to the control voltages provided by the control lines 106, 108, 206 and 208. The input RF1 signal is conveyed to the RF common 403 when the D-E RF switch 401 is ON and the E-D RF switch 402 is OFF. The input RF2 signal is conveyed to the RF common 403 when the D-E RF switch 401 is OFF and the E-D RF switch 402 is ON. When the RF1 input signal is not conveyed to the RF common 403, it is conveyed to ground through the optional load resistor 116 as described above. When the RF2 input signal is not conveyed to the RF common 403, it is conveyed to ground through the optional load resistor 216 as described above. The operation of the D-E RF switch 401 is described above with reference to the D-E RF switch 100 (FIG. 1). The operation of the E-D RF switch 402 is described above with reference to the E-D RF switch 200 (FIG. 2).

For the UNPOWERED-STATE, the D-E RF switch 401 is ON, and the RF1 input signal is conveyed from the input node 101 to the RF common 403, as described above. For the UNPOWERED-STATE, the E-D RF switch 402 is OFF, and the RF2 input signal is conveyed to ground through the optional load resistor 216, as described above.

Second Embodiment of a Single-Pole Double-Throw RF Switch

Figure 6:
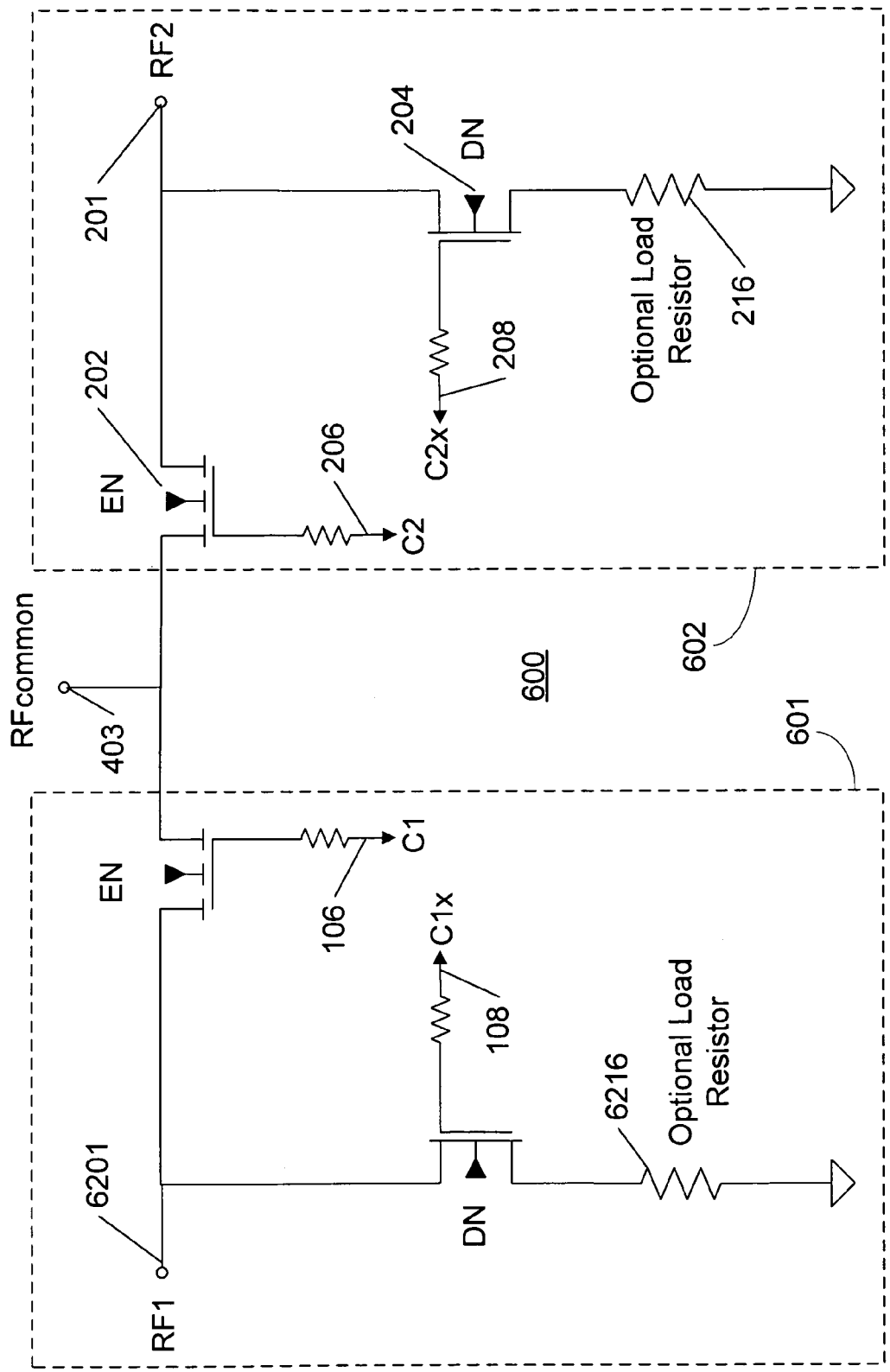
FIG. 6 schematically shows an embodiment of a SPDT RF switch including two E-D RF switches.

FIG. 6 schematically illustrates a second embodiment of a single-pole, double-throw (SPDT) RF switch 600 in accordance with the present teachings. The SPDT RF switch 600 includes a first E-D RF switch 601 and a second E-D RF switch 602. The first and second E-D RF switches 601 and 602 are similar to the E-D RF switch 200 described above with reference to FIG. 2, except that the RF output signals are applied to the RF common node 403 in the switch shown in FIG. 6.

The control voltages provided by the control circuit 510 (FIG. 5) (i.e., control signals C1, C1x, C2 and C2x, respectively) may be conveyed via the control lines 106, 108, 206 and 208 to like control lines 106, 108, 206 and 208, respectively, shown in the FIG. 6, as described above. The control lines 106, 108, 206 and 208 are also coupled to the bleeder circuits 112, 114, 212 and 214, respectively, as shown in FIG. 5.

For the POWERED-STATE, the SPDT RF switch 600 switches the output RF signal at the RF common 403 between either the input RF1 signal received at the input node 6201, or the input RF2 signal received at the input node 201, responsive to the control voltages provided by the control lines 106, 108, 206 and 208. The input RF1 signal is conveyed to the RF common 403 when the E-D RF switch 601 is ON and the E-D RF switch 602 is OFF. The input RF2 signal is conveyed to the RF common 403 when the E-D RF switch 601 is OFF and the E-D RF switch 602 is ON. When the RF1 input signal is not conveyed to the RF common 403, it is conveyed to ground through the optional load resistor 6216. When the RF2 input signal is not conveyed to the RF common 403, it is conveyed to ground through the optional load resistor 216. The operation of the E-D RF switches 601 and 602 is described in more detail hereinabove with reference to the E-D RF switch 200 (FIG. 2).

For the UNPOWERED-STATE, the E-D RF switch 601 is OFF, and the RF1 input signal is conveyed from the input node 6201 to ground, as described above in more detail. For the UNPOWERED-STATE, the E-D RF switch 602 is OFF, and the RF2 input signal is conveyed to ground through the optional load resistor 216 as described above in more detail.

Cascaded Single-Pole Double-Throw RF Switch

Persons skilled in the arts of designing RF circuits will understand and appreciate that a plurality of D-E RF switches as described above may be incorporated in a combined circuit known as "cascaded series-shunt pairs." For example, the output of a first D-E RF switch may be coupled to the input of a second D-E RF switch, the output of the second D-E RF switch may be coupled to the input of a third D-E RF switch, etc., until a last D-E RF switch is coupled to an RF common node or other final output for the combined circuit. Likewise, a plurality of E-D switches may be incorporated into a combined circuit of this type. Such combined circuits are referred to herein as "cascaded" circuits. The use of cascaded circuits allows for improvements in switch performance characteristics, such as, for example, isolation and linearity.

Figure 7:
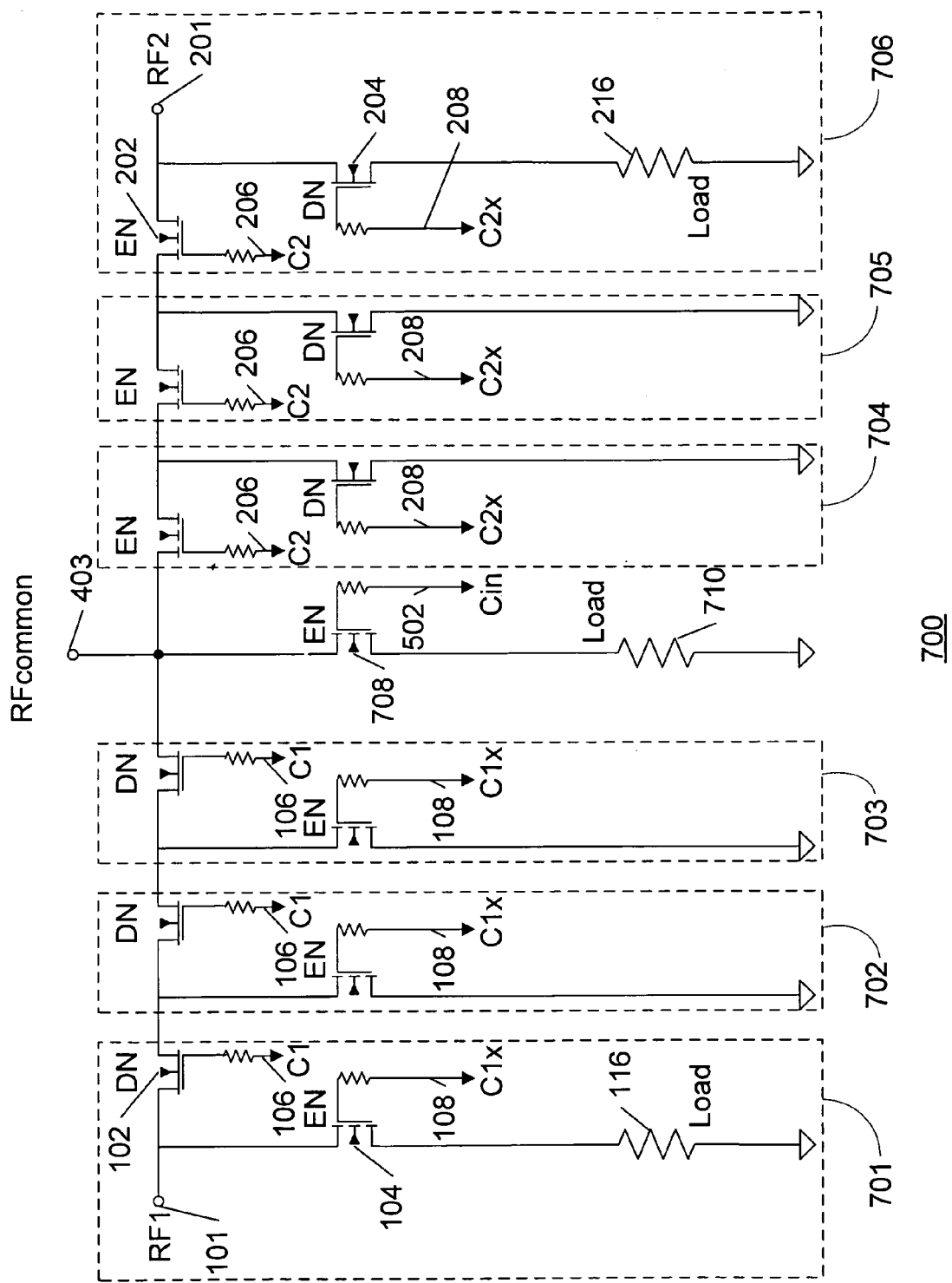
FIG. 7 schematically illustrates an embodiment of a SPDT RF switch including cascaded D-E RF switches and cascaded E-D RF switches.

As one example of how cascaded RF switches may be used according to the present teachings, FIG. 7 shows an SPDT RF switch 700 that includes cascaded D-E RF switches 701, 702, and 703; and cascaded E-D RF switches 704, 705 and 706. The D-E RF switch 701 is similar to the D-E RF switch 100 (FIG. 1), except that the RF output signal is coupled in FIG. 7 to the D-E RF switch 702. The D-E RF switches 702 and 703 are similar to the D-E RF switch 100 (FIG. 1), except that the RF input and RF output connections are slightly different. Also, there is an absence of the optional load resistors 116. The RF input of the D-E RF switch 702 receives the RF output of the D-E RF switch 701. The RF input of the D-E RF switch 703 receives the RF output of the D-E RF switch 702. The RF output of the D-E RF switch 703 is coupled to the RF common 403. Similarly, E-D RF switch 706 is similar to the E-D RF switch 200 (FIG. 2), except that the RF output signal is coupled to the RF input of the E-D RF switch 705.

The E-D RF switches 705 and 704 are, in one exemplary embodiment, similar to the E-D RF switch 200 (FIG. 2), except that the RF input and RF output connections are slightly different. Also, there is an absence of the optional load resistors 216. The RF input of the E-D RF switch 705 receives the RF output of the E-D RF switch 706. The RF input of the E-D RF switch 704 receives the RF output of the E-D RF switch 705. The RF output of the E-D RF switch 704 is coupled to the RF common 403.

The control voltages provided by the control circuit 510 (FIG. 5) may be coupled via the control lines 106, 108, 206 and 208 to the similar control lines 106, 108, 206 and 208, respectively, shown in FIG. 7, as described above. Each of the control lines 106, 108, 206 and 208 may also be coupled to the bleeder circuits 112, 114, 212, and 214, respectively, as shown in the FIG. 5 and as described above.

Optionally, a first channel of an EN transistor 708 is coupled to the RF common 403. A second channel of the EN transistor 708 is coupled to a first node of a load resistor 710. A second node of the load resistor 710 is coupled to ground. A control line 502 is coupled to the like control line 502 shown in the FIG. 5. The purpose of the optional elements EN transistor 708 and load resistor 710 is to provide an RF termination for the RF common 403 when the RF common 403 is not coupled to either the RF1 input signal or the RF2 input signal. The value of the optional load resistor 710 may be selected for RF impedance matching for external lines that may be coupled to the RF common 403.

The method of operation of the SPDT RF switch 700 shown in FIG. 7 is similar to the method of operation of the SPDT RF switch 400 described above with reference to FIG. 4. Optionally, control voltages may be selected so that all of the RF switches 701, 702, 703, 704, 705 and 706 are turned OFF. In this case, the optional EN transistor 708 may be turned ON, and the optional RF impedance matching load resistor 710 is coupled to the RF common 403.

RF Switch Including Stacked Transistors

In the examples of RF switches described above, an E-Sw, a D-Sw, an E-Sh, and a D-Sh may each comprise a single transistor. Alternatively, and more generally, an E-Sw, a D-Sw, an E-Sh, and a D-Sh may each comprise one or more transistors coupled together in a "stacked series circuit" configuration. U.S. Pat. No. 6,804,502, titled "SWITCH CIRCUIT AND METHOD OF SWITCHING RADIO FREQENCY SIGNALS", issued Oct. 12, 2004, describes RF switches using transistors in a stacked series circuit configuration. As noted hereinabove, this patent is commonly owned by the assignee hereof, and is incorporated by reference herein in its entirety for teachings on RF switches. Additional description, examples and description of the stacked series circuit configuration are presented hereinbelow.

Figure 8:
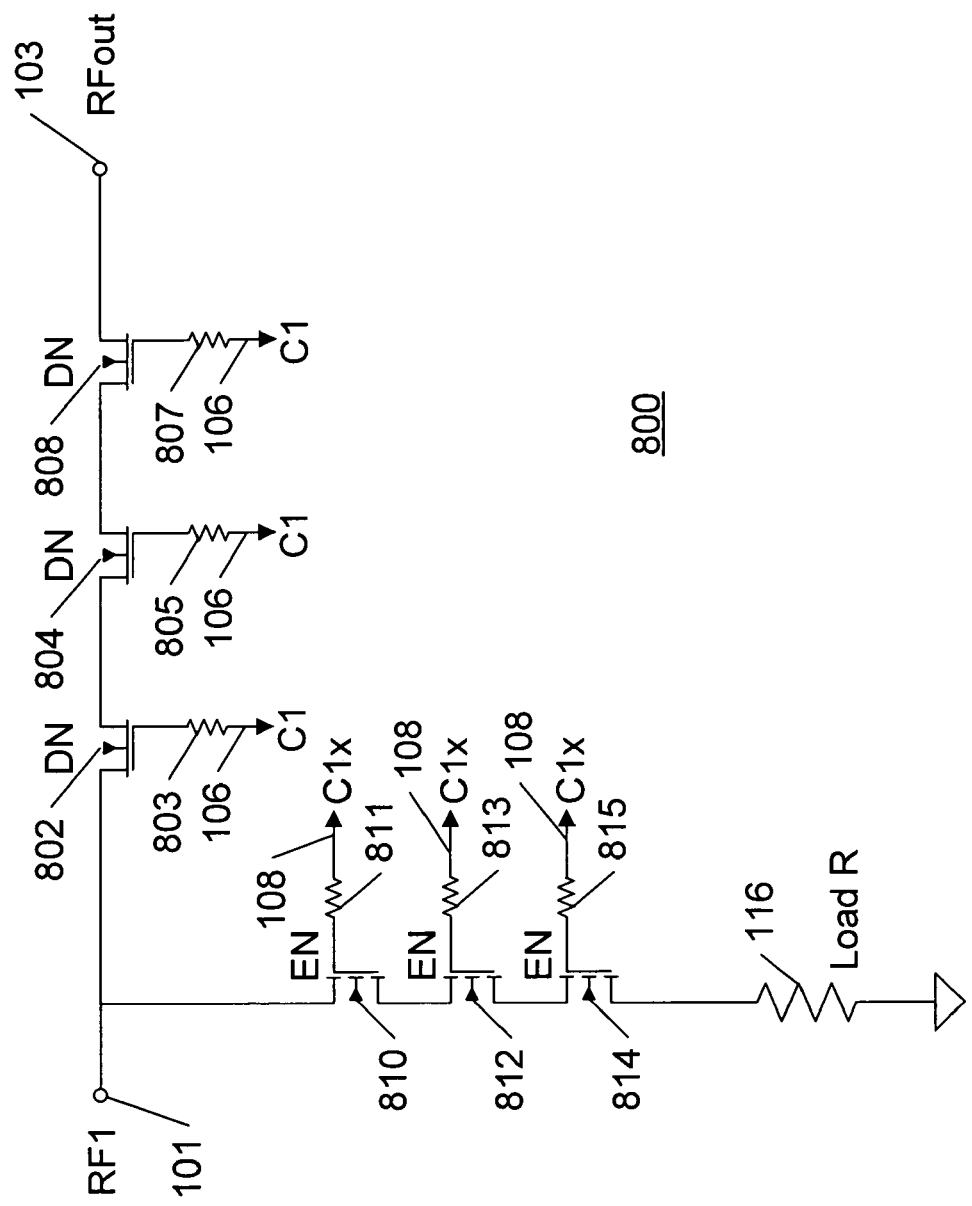
FIG. 8 schematically shows a D-E RF switch including stacked depletion-mode n-channel transistors and stacked enhancement-mode n-channel transistors.

As one example of how stacked transistors may be implemented according to the present disclosure, FIG. 8 shows a D-E RF switch 800 including stacked DN transistors 802, 804 and 808; and stacked EN transistors 810, 812 and 814. As shown in the embodiment of FIG. 8, a first node of the DN transistor 802 is coupled to receive an input RF1 signal from an input node 101. A second node of the DN transistor 802 is coupled to a first node of the DN transistor 804. A second node of the DN transistor 804 is coupled to a first node of the DN transistor 808. A second node of the DN transistor 808 is coupled to convey an output signal $RF_{out}$ to an output node 103.

A first node of the EN transistor 810 is coupled to receive the input RF1 signal. from the input node 101. A second node of the EN transistor 810 is coupled to a first node of the EN transistor 812. A second node of the EN transistor 812 is coupled to a first node of the EN transistor 814. A second node of the EN transistor 814 is coupled to a first node of an optional load transistor 116. A second node of the optional load transistor 116 is coupled to ground. The gates of the DN transistors 802, 804 and 808 are coupled to first nodes of the gate resistors 803, 805 and 807, respectively. The second nodes of the gate resistors 803, 805 and 807 are coupled to the plurality of control lines 106. The gate resistors are required to enable voltage division across the stack, by preventing parasitic coupling of RF signals between the gates of the stacked transistors.

The plurality of control lines 106 are coupled to like control lines 106 of the control circuit 510 (FIG. 5) to receive control voltages. The gates of the EN transistors 810, 812 and 814 are coupled to the first node of one of the gate resistors 811, 813 and 815, respectively. The second nodes of the gate resistors 811, 813 and 815 are coupled to the plurality of control lines 108. The plurality control lines 108 are coupled to like control lines 108 of the control circuit 510 to receive control voltages. The like control lines 106 and 108 are coupled to the bleeder circuits 112 and 212, respectively, as shown in the FIG. 5. Operation of the D-E RF switch 800 is similar to the operation of the D-E RF switch 100 described above with reference to FIG. 1.

Although the present exemplary D-E RF switch 800 implements three stacked transistors for the D-Sw (i.e., the DN transistors 802, 804 and 808), and three stacked transistors are used in implementing the E-Sh (i.e., DN transistors 802, 804 and 808), the skilled practitioner shall understand that an arbitrary plurality of stacked transistors may be employed without departing from the scope or spirit of the present teachings. Likewise, the skilled practitioner shall appreciate that the E-D RF switches, E-Sws and D-Shs in any of the examples of the present disclosure may be implemented using an arbitrary plurality of stacked transistors. Further, as briefly noted above and as described in more detail in the above-incorporated co-pending and commonly owned application Ser. No. 11/347,014, filed Feb. 3, 2006, pending, entitled "Symmetrically and Asymmetrically Stacked Transistor Grouping RF Switch", and its associated above-incorporated provisional application, U.S. Provisional Application No. 60/650,033, filed Feb. 3, 2005, entitled "Symmetrically and Asymmetrically Stacked Transistor Grouping RF Switch", the skilled practitioner shall appreciate that in any of the D-E or E-D RF switches described above, the E-Sw, D-Sw, E-Sh, and D-Sh circuits may each comprise one or more transistors coupled together in a "stacked" or serial configuration. As described in more detail in the incorporated application Ser. No. 11/347,014, filed Feb. 3, 2006, and the incorporated related Provisional Application No. 60/650,033, filed Feb. 3, 2005, the E-Sw, D-Sw, E-Sh, and D-Sh circuits may be implemented using asymmetrically or symmetrically stacked transistor groupings as may be convenient and appropriate for a particular switch design and to accommodate certain RF voltage levels.

Method of Fabrication

With varying performance results, RF switches (not including the D-E and E-D RF switches disclosed herein) have heretofore been implemented in different component technologies, including bulk complementary-metal-oxide-semiconductor (CMOS) and gallium-arsenide (GaAs) technologies. In fact, most high-performance high-frequency switches use GaAs technology. For example, although the exemplary embodiments presented herein are represented as circuits fabricated using SOI devices, those skilled in the arts of RF circuit design and manufacture shall readily appreciate and understand that GaAs devices may also be employed, and that such devices fall within the spirit and scope of the present teachings.

Although GaAs RF switch implementations offer improved performance characteristics relative to bulk CMOS, the technology has several disadvantages. For example, GaAs technology exhibits relatively low yields of properly functioning integrated circuits. GaAs RF switches tend to be relatively expensive to design and manufacture. In addition, although GaAs switches exhibit improved insertion loss characteristics as described above, they may have low frequency limitations due to slow states present in the GaAs substrate. The technology also does not lend itself to high levels of integration, which requires that digital control circuitry associated with the RF switch be implemented "off chip" from the switch. The low power control circuitry associated with the switch has proven difficult to integrate. This is disadvantageous as it both increases the overall system costs or manufacture, size and complexity, as well as reducing system throughput speeds.

Most critically for GaAs integrated circuit technology, the integration of EN and DN transistors as a monolithic integrated circuit (IC) is difficult because of high-cost, low-yield and poor performance. Although it is known how to manufacture monolithic ICs in bulk CMOS having both EN and DN transistors, bulk CMOS RF switches disadvantageously exhibit high insertion loss, low compression, and poor linearity performance characteristics.

In one embodiment of the present disclosure, the exemplary RF switches and bleeder circuits described hereinabove are implemented using a fully insulating substrate silicon-on-insulator (SOI) technology. More specifically, the MOSFET transistors of the present disclosure may be implemented using "Ultra-Thin-Silicon (UTSi)" (also referred to herein as "ultrathin silicon-on-sapphire") technology. In accordance with UTSi manufacturing methods, the transistors used to implement the inventive RF switch are formed in an extremely thin layer of silicon in an insulating sapphire wafer. The fully insulating sapphire substrate enhances the performance characteristics of the inventive RF switch by reducing the deleterious substrate coupling effects associated with non-insulating and partially insulating substrates. For example, improvements in insertion loss may be realized by lowering the transistor ON state resistances and by reducing parasitic substrate conductances and capacitances. In addition, switch isolation is improved using the fully insulating substrates provided by UTSi technology. Owing to the fully insulating nature of silicon-on-sapphire technology, the parasitic capacitance between the nodes of the RF switches is greatly reduced as compared with bulk CMOS and other traditional integrated circuit manufacturing technologies.

Most critically, for SOI in general, and UTSi in particular, methods to manufacture monolithic ICs including both EN and DN transistors are well known to persons skilled in the arts of semiconductor IC design and manufacturing.

Silicon on Insulator RF Integrated Circuits

As is well known, SOI has been used in the implementation of high performance microelectronic devices, primarily in applications requiring radiation hardness and high speed operation. SOI technologies include, for example, SIMOX, bonded wafers having a thin silicon layer bonded to an insulating layer, and silicon-on-sapphire. In order to achieve the desired RF switch performance characteristics described hereinabove, in one embodiment, the inventive RF switch is fabricated on a sapphire substrate.

Fabrication of devices on an insulating substrate requires that an effective method for forming silicon CMOS devices on the insulating substrate be used. The advantages of using a composite substrate comprising a monocrystalline semiconductor layer, such as silicon, epitaxially deposited on a supporting insulating substrate, such as sapphire, are well-recognized, and can be realized by employing as the substrate an insulating material, such as sapphire ($Al_2O_3$), spinel, or other known highly insulating materials, and providing that the conduction path of any inter-device leakage current must pass through the substrate.

An "ideal" SOI wafer can be defined to include a completely monocrystalline, defect-free silicon layer of sufficient thickness to accommodate the fabrication of active devices therein. The silicon layer would be adjacent to an insulating substrate and would have a minimum of crystal lattice discontinuities at the silicon-insulator interface. Early attempts to fabricate this "ideal" silicon-on-insulator wafer were frustrated by a number of significant problems, which can be summarized as (1) substantial incursion of contaminants into the epitaxially deposited silicon layer, especially the p-dopant aluminum, as a consequence of the high temperatures used in the initial epitaxial silicon deposition and the subsequent annealing of the silicon layer to reduce defects therein; and (2) poor crystalline quality of the epitaxial silicon layers when the problematic high temperatures were avoided or worked around through various implanting, annealing, and/or re-growth schemes.

It has been found that the high quality silicon films suitable for demanding device applications can be fabricated on sapphire substrates by a method that involves epitaxial deposition of a silicon layer on a sapphire substrate, low temperature ion implant to form a buried amorphous region in the silicon layer, and annealing the composite at temperatures below about 950 degrees C.

Examples of and methods for making such silicon-on-sapphire devices are described in U.S. Pat. No. 5,416,043 ("Minimum charge FET fabricated on an ultrathin silicon on sapphire wafer"); U.S. Pat. No. 5,492,857 ("High-frequency wireless communication system on a single ultrathin silicon on sapphire chip"); U.S. Pat. No. 5,572,040 ("High-frequency wireless communication system on a single ultrathin silicon on sapphire chip"); U.S. Pat. No. 5,596,205 ("High-frequency wireless communication system on a single ultrathin silicon on sapphire chip"); U.S. Pat. No. 5,600,169 ("Minimum charge FET fabricated on an ultrathin silicon on sapphire wafer"); U.S. Pat. No. 5,663,570 ("High-frequency wireless communication system on a single ultrathin silicon on sapphire chip"); U.S. Pat. No. 5,861,336 ("High-frequency wireless communication system on a single ultrathin silicon on sapphire chip"); U.S. Pat. No. 5,863,823 ("Self-aligned edge control in silicon on insulator"); U.S. Pat. No. 5,883,396 ("High-frequency wireless communication system on a single ultrathin silicon on sapphire chip"); U.S. Pat. No. 5,895,957 ("Minimum charge FET fabricated on an ultrathin silicon on sapphire wafer"); U.S. Pat. No. 5,920,233 ("Phase locked loop including a sampling circuit for reducing spurious side bands"); U.S. Pat. No. 5,930,638 ("Method of making a low parasitic resistor on ultrathin silicon on insulator"); U.S. Pat. No. 5,973,363 ("CMOS circuitry with shortened P-channel length on ultrathin silicon on insulator"); U.S. Pat. No. 5,973,382 ("Capacitor on ultrathin semiconductor on insulator"); and U.S. Pat. No. 6,057,555 ("High-frequency wireless communication system on a single ultrathin silicon on sapphire chip"). All of these referenced patents are incorporated herein in their entirety for their teachings on ultrathin silicon-on-sapphire integrated circuit design and fabrication.

Using the methods described in the patents referenced above, electronic devices can be formed in an extremely thin layer of silicon on an insulating synthetic sapphire wafer. The thickness of the silicon layer is typically less than 150 nm. Such an "ultrathin" silicon layer maximizes the advantages of the insulating sapphire substrate and allows the integration of multiple functions on a single integrated circuit. Traditional transistor isolation wells required for thick silicon are unnecessary, simplifying transistor processing and increasing circuit density. To distinguish these above-referenced methods and devices from earlier thick-silicon embodiments, they are herein referred to collectively as "ultrathin silicon-on-sapphire."

In some embodiments of the present disclosure, the MOS transistors may be formed in ultrathin silicon-on-sapphire wafers by the methods disclosed in U.S. Pat. Nos. 5,416,043; 5,492,857; 5,572,040; 5,596,205; 5,600,169; 5,663,570; 5,861,336; 5,863,823; 5,883,396; 5,895,957; 5,920,233; 5,930,638; 5,973,363; 5,973,382; and 6,057,555. However, other known methods of fabricating silicon-on-sapphire integrated circuits can be used without departing from the spirit or scope of the present teachings. The above-cited patents are hereby incorporated by reference herein as if set forth in full.

Like other bulk and SOI CMOS processes, an SOS EN transistor, suitable for implementing some embodiments of the present disclosure, may be fabricated with a p-type implant into the channel region with n-type source and drain regions, and may have a threshold voltage of approximately +500 mV. The threshold voltage is directly related to the p-type doping level, with higher doping resulting in higher threshold. Similarly, the SOS EP transistor is built with an n-type channel region and p-type source and drain regions. Again, the doping level defines the threshold voltage with higher doping resulting in a more negative threshold.

An SOS DN transistor, suitable for implementing some embodiments of the present disclosure may be fabricated by applying the p-type channel-implant mask to the n-type transistor, resulting in a structure that has n-type channel, source, and drain regions and a negative threshold voltage of approximately −500 mV. Similarly, a suitable DP transistor may be built by applying the n-type channel-implant mask to the p-type transistor, resulting in a structure that has p-type channel, source, and drain regions and a positive threshold voltage of approximately +500 mV.

A reference relating to the fabrication of enhancement-mode and depletion-mode transistors in SOS is "CMOS/SOS/LSI Switching Regulator Control Device," Orndorff, R. and Butcher, D., Solid-State Circuits Conference, Digest of Technical Papers, 1978 IEEE International, Volume XXI, pp. 234-235, February 1978. The Orndorff reference is hereby incorporated by reference as if set forth in full.

A number of embodiments of the present inventive teachings have been described. Nevertheless, it will be understood that various modifications may be made without departing from the spirit or scope of the inventive teachings. For example, although SPST and SPDT switches have been described for exemplary purposes, persons skilled in the arts of electronics design will appreciate that multi-pole, multi-throw switches (i.e., switches having an arbitrary number of poles and/or throws) may be designed, fabricated and used according to the present inventive teachings. In another example, it will be understood by those skilled in the art that the functions described as being part of one module may in general be performed equivalently in another module.

Accordingly, it is to be understood that the inventive concepts are not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A monolithic integrated circuit (IC) RF switch comprising a plurality of MixedMode RF switches coupled together in a cascaded series-shunt configuration such that the output of a preceding MixedMode RF switch is coupled to the input of an immediately subsequent MixedMode RF switch, an input of the cascaded series-shunt configuration being the input of a first one of the cascaded MixedMode RF switches and an output of the cascaded series-shunt configuration being the output of a last one of the MixedMode RF switches, wherein a MixedMode RF switch is defined as one of the following RF switch types:
  (a) a depletion-enhancement (D-E) RF switch comprising:
    (1) a depletion-mode switch (D-Sw) circuit operatively coupled to receive a first RF signal from an RF input of the D-E RF switch and to selectively convey the first RF signal to an output of the D-E RF switch under control of a first control line C1; and
    (2) an enhancement-mode shunt (E-Sh) circuit operatively coupled to receive the first RF signal and to selectively convey the first RF signal to ground under control of a second control line C1x; and
  (b) an enhancement-depletion (E-D) RF switch comprising:
    (1) an enhancement-mode switch (E-Sw) circuit operatively coupled to receive a second RF signal from an input of the E-D RF switch and to selectively convey the second RF signal to an output of the E-D RF switch under control of a third control line C2; and
    (2) a depletion-mode shunt (D-Sh) circuit operatively coupled to receive the second RF signal from the input of the E-D RF switch and to selectively convey the second RF signal to ground under control of a fourth control line C2x.

2. The IC RF switch of claim 1, wherein each MixedMode RF switch is a D-E RF switch.

3. The IC RF switch of claim 1, wherein each MixedMode RF switch is an E-D RF switch.

4. A monolithic integrated circuit (IC) RF switch comprising at least one RF switch selected from the following RF switch types:
  (a) a depletion-enhancement (D-E) RF switch comprising:
    (1) a depletion-mode switch (D-Sw) circuit operatively coupled to receive a first RF signal from an RF input of the D-E RF switch and to selectively convey the first RF signal to an output of the D-E RF switch under control of a first control line C1; and
    (2) an enhancement-mode shunt (E-Sh) circuit operatively coupled to receive the first RF signal and to selectively convey the first RF signal to ground under control of a second control line C1x; and
  (b) an enhancement-depletion (E-D) RF switch comprising:
    (1) an enhancement-mode switch (E-Sw) circuit operatively coupled to receive a second RF signal from an input of the E-D RF switch and to selectively convey the second RF signal to an output of the E-D RF switch under control of a third control line C2; and
    (2) a depletion-mode shunt (D-Sh) circuit operatively coupled to receive the second RF signal from the input of the E-D RF switch and to selectively convey the second RF signal to ground under control of a fourth control line C2x;
  wherein when the IC RF switch is not provided with operating power it operates in an UNPOWERED-STATE, and wherein when the IC RF switch is provided with operating power it operates in a POWERED-STATE, further comprising a bleeder circuit operatively coupled to ground and to one of the control lines C1, C1x, C2 and C2x, wherein the bleeder circuit has a first impedance between ground and said one of the control lines when the RF switch operates in the POWERED-STATE, and a second impedance between ground and said one of the control lines when the RF switch operates in the UNPOWERED-STATE, and the second impedance is less than the first impedance.

5. The IC RF switch of claim 4, wherein the bleeder circuit further comprises:
  a) a first depletion-mode p-type transistor (DP1) having a first channel node operatively coupled to said one of the control lines;
  b) a first depletion-mode n-type transistor having a first channel node operatively coupled to a second channel node of DP1 and a second channel node operatively coupled to ground;
  c) a second depletion-mode p-type transistor (DP2) having a first channel node operatively coupled to a gate of DP1, a second channel node operatively coupled to a gate of DN1, and a gate operatively coupled to a bias supply voltage VDD;
  d) a VDD voltage divider circuit operatively coupled to VDD, ground, the gate of DP1, and the first channel node of DP2 to convey a divided voltage level of VDD to the gate of DP1 and to the first channel node of DP2; and
  e) a VSS voltage divider circuit operatively coupled to a bias supply voltage VSS, ground, the gate of DN1, and the second channel node of DP2 to convey a divided voltage level of VSS to the gate of DN1 and to the second channel node of DP2.

6. The IC RF switch of claim 5, wherein the bleeder circuit further comprises:
  a) a third depletion-mode p-type transistor (DP3) interposed between the first channel node of DP1 and said one of the control lines, wherein the first channel node of DP1 is operatively coupled to a second channel node of DP3, a first channel node of DP3 is operatively coupled to said one of the control lines, and a gate of DP3 is operatively coupled to ground;
  b) a second depletion-mode n-type transistor (DN2) interposed between the second node of DP1 and the first channel node of DN1, wherein a second channel node of DN2 is operatively coupled to the first channel node of DN1, and a first channel node of DN2 is operatively coupled to the second channel node of DP1, and a gate of DN2 is operatively coupled to ground; and
  c) a fourth depletion-mode p-type transistor (DP4) interposed between the second channel node of DP2 and both the gate of DN1 and the VSS voltage divider circuit, wherein a first channel node of DP4 is operatively coupled to the second channel node of DP2, a second channel node of the DP4 is operatively coupled to the gate of DN1, and a gate of DP4 is operatively coupled to receive the divided voltage level of VDD.

7. The IC RF switch of claim 6, wherein the bleeder circuit further comprises:
  a) a fifth depletion-mode p-type transistor (DP5), wherein a first channel node of DP5 is operatively coupled to VSS, and wherein a second channel node of DP5 is operatively coupled to ground, and wherein a gate of DP5 is operatively coupled to the VDD voltage divider circuit to receive the divided voltage level of VDD; and b) a capacitor, wherein a first node of the capacitor is operatively coupled to the first channel node of DP5 and to VSS, and wherein a second node of the capacitor is operatively coupled to ground.

8. A monolithic integrated circuit (IC) RF switch comprising at least one RF switch selected from the following RF switch types:

(a) a depletion-enhancement (D-E) RF switch comprising:
  (1) a depletion-mode switch (D-Sw) circuit operatively coupled to receive a first RF signal from an RF input of the D-E RF switch and to selectively convey the first RF signal to an output of the D-E RF switch under control of a first control line C1; and
  (2) an enhancement-mode shunt (E-Sh) circuit operatively coupled to receive the first RF signal and to selectively convey the first RF signal to ground under control of a second control line C1x; and (b) an enhancement-depletion (E-D) RF switch comprising:
  (1) an enhancement-mode switch (E-Sw) circuit operatively coupled to receive a second RF signal from an input of the E-D RF switch and to selectively convey the second RF signal to an output of the E-D RF switch under control of a third control line C2; and
  (2) a depletion-mode shunt (D-Sh) circuit operatively coupled to receive the second RF signal from the input of the E-D RF switch and to selectively convey the second RF signal to ground under control of a fourth control line C2x;

wherein at least one of the D-Sw circuit, E-Sh circuit, E-Sw circuit, and D-Sh circuit components comprises a plurality of transistors coupled together in a stacked configuration such that channels of the plurality of transistors are coupled in series.

9. The IC RF switch of claim 8, wherein the plurality of transistors are configured in a symmetrically stacked configuration.

10. The IC RF switch of claim 8, wherein the plurality of transistors are configured in an asymmetrically stacked configuration.

11. A monolithic integrated circuit single-pole double-throw (SPDT) RF switch, comprising:

(a) a first RF switch for selectively conveying a first RF signal between a first RF input node and an RF common node (RFcommon), the first RF switch including a D-E RF switch that has:
  (1) a depletion-mode switch (D-Sw) circuit controlled by a first control line C1 and operatively coupled to selectively convey the first RF signal to RFcommon; and
  (2) an enhancement-mode shunt (E-Sh) circuit controlled by a second control line C1x and operatively coupled to selectively convey the first RF signal to ground; and (b) a second RF switch for selectively conveying a second RF signal between a second RF input node and RFcommon, the second RF switch including an E-D RF switch that has:
  (1) an enhancement-mode switch (E-Sw) circuit operatively coupled to convey the second RF signal to RFcommon under control of a third control line C2; and
  (2) a depletion-mode shunt (D-Sh) circuit operatively coupled to convey the second RF signal to ground under control of a fourth control line C2x;

wherein the first RF switch or the second RF switch includes a plurality of RF switches cascaded in series between the corresponding input node and RFcommon.

12. The SPDT RF switch of claim 11, further comprising a plurality of cascaded D-E RF switches configured to selectively convey the first RF signal between the first RF input node and RFcommon.

13. The SPDT RF switch of claim 11, further comprising a plurality of cascaded E-D RF switches configured to selectively convey the second RF signal between the second RF input node and RFcommon.

14. A monolithic integrated circuit single-pole double-throw (SPDT) RF switch. comprising:

(a) a D-E RF switch for selectively conveying a first RF signal between a first RF input node and an RF common node (RFcommon), including:
  (1) a depletion-mode switch (D-Sw) circuit controlled by a first control line C1 and operatively coupled to selectively convey the first RF signal to RFcommon: and
  (2) an enhancement-mode shunt (E-Sh) circuit controlled by a second control line C1x and operatively coupled to selectively convey the first RF signal to ground; and (b) an E-D RF switch for selectively conveying a second RF signal between a second RF input node and RFcommon, including:
  (1) an enhancement-mode switch (E-Sw) circuit operatively coupled to convey the second RF signal to RFcommon under control of a third control line C2; and
  (2) a depletion-mode shunt (D-Sh) circuit operatively coupled to convey the second RF signal to ground under control of a fourth control line C2x;

wherein when the switch is not provided with operating power it operates in an UNPOWERED-STATE, and wherein when the switch is provided with operating power it operates in a POWERED-STATE, further comprising a bleeder circuit operatively coupled to ground and to one of the control lines, wherein the bleeder circuit has a first impedance between ground and said one of the control lines when the RF switch operates in the POWERED-STATE, and wherein the bleeder circuit has a second impedance between ground and said one of the control lines when the RF switch operates in the UNPOWERED-STATE, and wherein the second impedance is less than the first impedance.

15. A monolithic integrated circuit single-pole double-throw (SPDT) RF switch, comprising:

(a) a D-E RF switch for selectively conveying a first RF signal between a first RF input node and an RF common node (RFcommon), including:
  (1) a depletion-mode switch (D-Sw) circuit controlled by a first control line C1 and operatively coupled to selectively convey the first RF signal to RFcommon; and
  (2) an enhancement-mode shunt (E-Sh) circuit controlled by a second control line C1x and operatively coupled to selectively convey the first RF signal to ground; and (b) an E-D RF switch for selectively conveying a second RF signal between a second RF input node and RFcommon, including:

(1) an enhancement-mode switch (E-Sw) circuit operatively coupled to convey the second RF signal to RFcommon under control of a third control line C2; and (2) a depletion-mode shunt (D-Sh) circuit operatively coupled to convey the second RF signal to ground under control of a fourth control line C2x;

wherein at least one of the D-Sw circuit, E-Sh circuit, E-Sw circuit, and D-Sh circuit components comprises a plurality of transistors coupled together in a stacked configuration such that channels of the plurality of transistors are coupled in series.

16. The SPDT RF switch of claim 15, wherein the plurality of transistors are configured in a symmetrically stacked configuration.

17. The SPDT RF switch of claim 15, wherein the plurality of transistors are configured in an asymmetrically stacked configuration.

18. A monolithic integrated circuit single-pole double-throw (SPDT) RF switch, comprising:

(a) a first E-D RF switch configured to selectively convey a first RF signal between a first RF input node and an RF common node (RFcommon), including:

(1) a first enhancement-mode switch (E-Sw) circuit operatively coupled to selectively convey the first RF signal to the RFcommon under control of a first control line C1; and (2) a first depletion-mode shunt (D-Sh) circuit operatively coupled to selectively convey the first RF signal to ground under control of a second control line C1x; and (b) a second E-D RF switch configured to selectively convey a second RF signal between a second RF input node and RFcommon, including:

(1) a second enhancement-mode switch (E-Sw) circuit operatively coupled to selectively convey the second RF signal to RFcommon under control of a third control line C2; and (2) a second depletion-mode shunt (D-Sh) circuit operatively coupled to selectively convey the second RF signal to ground under control of a fourth control line C2x;

wherein when the switch is not provided with operating power it operates in an UNPOWERED-STATE and when the switch is provided with operating power it operates in a POWERED-STATE, further comprising a bleeder circuit operatively coupled to ground and to at least one of the control lines, wherein the bleeder circuit has a first impedance between ground and said one of the control lines when the RF switch operates in the POWERED-STATE and a second impedance between ground and said one of the control lines when the RF switch operates in the UNPOWERED-STATE, and the second impedance is less than the first impedance.

19. The SPDT RF switch of claim 18, wherein at least one of the E-D RF switches comprises a plurality of E-D RF switches coupled together in a cascaded series-shunt configuration such that the output of each preceding E-D RF switch is coupled to the input of an immediately subsequent E-D RF switch, an input of the cascaded series-shunt configuration being the input of a first E-D RF switch and an output of the cascaded series-shunt configuration being the output of a last E-D RF switch.

20. A monolithic integrated circuit single-pole double-throw (SPDT) RF switch, comprising:

(a) a first E-D RF switch configured to selectively convey a first RF signal between a first RF input node and an RF common node (RFcommon), including:

(1) a first enhancement-mode switch (E-Sw) circuit operatively coupled to selectively convey the first RF signal to the RFcommon under control of a first control line C1; and (2) a first depletion-mode shunt (D-Sh) circuit operatively coupled to selectively convey the first RF signal to ground under control of a second control line C1x; and (b) a second E-D RF switch configured to selectively convey a second RF signal between a second RF input node and RFcommon, including:

(1) a second enhancement-mode switch (E-Sw) circuit operatively coupled to selectively convey the second RF signal to RFcommon under control of a third control line C2; and (2) a second depletion-mode shunt (D-Sh) circuit operatively coupled to selectively convey the second RF signal to ground under control of a fourth control line C2x;

wherein at least one of the first E-Sw circuit, the first D-Sh circuit, the second E-Sw circuit and the second D-Sh circuit comprises a plurality of transistors coupled together in a stacked configuration such that channels of the plurality of transistors are coupled in series.

21. The SPDT RF switch of claim 20, wherein the plurality of transistors are configured in a symmetrically stacked configuration.

22. The SPDT RF switch of claim 20, wherein the plurality of transistors are configured in an asymmetrically stacked configuration.

* * * * *